US011625944B2

(12) United States Patent
Lin et al.

(10) Patent No.: US 11,625,944 B2
(45) Date of Patent: Apr. 11, 2023

(54) FINGERPRINT RECOGNITION MODULE, SCREEN ASSEMBLY, AND ELECTRONIC DEVICE

(71) Applicant: Huawei Technologies Co., Ltd., Shenzhen (CN)

(72) Inventors: Jiao Lin, Shanghai (CN); Xu Peng, Shanghai (CN); Xiujuan Wan, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/604,678

(22) PCT Filed: Apr. 15, 2020

(86) PCT No.: PCT/CN2020/084916
§ 371 (c)(1),
(2) Date: Oct. 18, 2021

(87) PCT Pub. No.: WO2020/211779
PCT Pub. Date: Oct. 22, 2020

(65) Prior Publication Data
US 2022/0207907 A1    Jun. 30, 2022

(30) Foreign Application Priority Data

Apr. 16, 2019  (CN) .......................... 201910305191.5
Jun. 18, 2019  (CN) .......................... 201910528102.3

(51) Int. Cl.
*G06V 40/13*    (2022.01)

(52) U.S. Cl.
CPC .............................. *G06V 40/1318* (2022.01)

(58) Field of Classification Search
None
See application file for complete search history.

(56) References Cited

U.S. PATENT DOCUMENTS

| | | | |
|---|---|---|---|
| 11,308,725 B2 * | 4/2022 | Bu ...................... | G06V 40/1318 |
| 2012/0199728 A1 * | 8/2012 | Momtahan .............. | G06F 3/042 |
| | | | 250/221 |
| 2017/0108672 A1 | 4/2017 | Chang et al. | |
| 2017/0337412 A1 | 11/2017 | Bhat et al. | |

(Continued)

FOREIGN PATENT DOCUMENTS

| | | |
|---|---|---|
| CN | 107145869 A | 9/2017 |
| CN | 108021845 A | 5/2018 |

(Continued)

*Primary Examiner* — Joseph R Haley
(74) *Attorney, Agent, or Firm* — Conley Rose, P.C.

(57) ABSTRACT

A fingerprint recognition system is disposed below a screen assembly of an electronic device and includes a light-emitting diode (LED), an image sensor, and a light shielding member. A light emitting surface of the LED faces the screen assembly and is configured to emit an optical signal. A photosensitive surface of the image sensor faces the screen assembly, where the optical signal received by the image sensor includes a fingerprint optical signal returned after being emitted by the LED to a finger, to generate a fingerprint image. The light shielding member is located between the LED and the image sensor, to block a part of signal light emitted by the LED.

20 Claims, 14 Drawing Sheets

(56) References Cited

U.S. PATENT DOCUMENTS

| | | | |
|---|---|---|---|
| 2019/0034020 A1 | 1/2019 | He et al. | |
| 2019/0087627 A1 | 3/2019 | Ling et al. | |
| 2019/0286870 A1* | 9/2019 | Ling | ........... G06F 1/1643 |
| 2020/0050823 A1 | 2/2020 | Jiang et al. | |
| 2020/0293738 A1* | 9/2020 | Zhang | ........... G06V 40/1318 |
| 2021/0357610 A1 | 11/2021 | Bu | |

FOREIGN PATENT DOCUMENTS

| | | |
|---|---|---|
| CN | 108388827 A | 8/2018 |
| CN | 108885697 A | 11/2018 |
| CN | 109145682 A | 1/2019 |
| CN | 109359627 A | 2/2019 |
| CN | 109582177 A | 4/2019 |
| JP | 2010091864 A | 4/2010 |
| JP | 2011198083 A | 10/2011 |
| JP | 2012150619 A | 8/2012 |
| TW | I635306 B | 9/2018 |
| WO | 2018083847 A1 | 5/2018 |

* cited by examiner (a)

(b)

FINGERPRINT RECOGNITION MODULE, SCREEN ASSEMBLY, AND ELECTRONIC DEVICE

CROSS-REFERENCE TO RELATED APPLICATIONS

This application is a U.S. National Stage of International Patent Application No. PCT/CN2020/084916 filed on Apr. 15, 2020, which claims priority to Chinese Patent Application No. 201910305191.5 filed on Apr. 16, 2019 and Chinese Patent Application No. 201910528102.3 filed on Jun. 18, 2019. All of the aforementioned patent applications are hereby incorporated by reference in their entireties.

TECHNICAL FIELD

This application relates to the fingerprint recognition field, and more specifically, to a fingerprint recognition module, a screen assembly, and an electronic device.

BACKGROUND

As a screen-to-body ratio of a mobile phone increases and an all-in-one rear cover is designed, a demand for under-display fingerprint recognition is becoming stronger. Optical under-display fingerprint recognition is one of under-display fingerprint recognition technologies. A working principle of the optical under-display fingerprint recognition is as follows: When a finger is placed on a screen of a terminal, the terminal may emit an optical signal to the finger. After the optical signal is reflected by a fingerprint of the finger, reflected light forms a fingerprint image on a sensor below the screen.

Currently, in a known solution, the optical under-display fingerprint recognition is implemented by providing an additional light source with relatively strong penetration force below the screen. Specifically, after the additional light source penetrates the screen to arrive at the finger, a part of optical signals may return to be received by the sensor below the screen. This part of returned optical signals may carry fingerprint information. After receiving the optical signals that carry the fingerprint information, the sensor may generate a fingerprint image for fingerprint recognition. However, the additional light source may produce a relatively large amount of reflected light when being irradiated on the screen. The reflected light does not arrive at the finger, and does not carry the fingerprint information. If the reflected light is received by the sensor, interference to the optical signal that carries the fingerprint information and that is received by the sensor is caused. As a result, definition of the fingerprint image is affected.

SUMMARY

This application provides a fingerprint recognition module, a screen assembly, and an electronic device, to reduce interference from reflected light to fingerprint information, thereby improving definition of a fingerprint image.

According to a first aspect, a fingerprint recognition module is provided. The fingerprint recognition module is disposed below a screen assembly of an electronic device, and includes a light emitting diode (light emitting diode, LED), an image sensor, and a light shielding member. A light emitting surface of the LED is opposite to a lower surface of the screen assembly and is used to emit an optical signal. The image sensor is located on one side of the LED, and a photosensitive surface of the image sensor is opposite to the lower surface of the screen assembly and is used to receive an optical signal. The optical signal received by the image sensor includes a fingerprint optical signal returned after being emitted by the LED to a finger, and the fingerprint optical signal is used to generate a fingerprint image. The light shielding member is partially or entirely located between the LED and the image sensor, to block a part of optical signals emitted by the LED.

The fingerprint optical signal may be an optical signal that carries fingerprint information. In this embodiment of this application, fingerprint optical signals include an optical signal that is emitted by the LED to the inside of the finger and that is scattered and refracted after being propagated through the inside of the finger, and an optical signal that is emitted by the LED to a surface of the finger and that is reflected by the surface of the finger.

Correspondingly, in the optical signals emitted by the LED, when a part of the optical signals pass through a surface of the screen assembly, the optical signals arrive at the image sensor through one or more reflections. This part of optical signals do not arrive at the finger, and do not carry the fingerprint information. Therefore, interference to the fingerprint optical signal is caused. In this embodiment of this application, an optical signal that arrives at the image sensor and that does not carry the fingerprint information is referred to as a stray optical signal.

It should be understood that the fingerprint recognition module provided in this embodiment of this application may be applied to a liquid crystal display (liquid crystal display, LCD) screen, or may be applied to an organic light-emitting diode (organic light-emitting, OLED) screen. An application scope of the fingerprint recognition module is not limited in this application.

Therefore, the light shielding member is disposed in a region near the LED, and large-angle emergent light emitted by the LED is blocked, so that stray light that arrives at the image sensor through at least one reflection on the surface of the screen assembly is reduced. In this way, interference from the stray light to the fingerprint optical signal can be reduced, or in other words, interference from the stray light to the fingerprint information is reduced, thereby improving definition of the fingerprint image.

With reference to the first aspect, in some implementations of the first aspect, on a plane that passes through a light emitting center of the LED and a center of an active area (active area, AA) of the image sensor, the light shielding member is configured to block an optical signal whose emergent angle is greater than $\theta$ and that is emitted by the LED, where $\theta$ is a predefined value.

In other words, the light shielding member is disposed near the LED, so that signal light emitted by the LED can be controlled to be within an angle range.

Because a shape of the light shielding member is not limited in this application, the light shielding member may block, in one direction, an optical signal emitted by the LED, or may block, from all around, optical signals emitted by the LED. Therefore, maximum emergent angles of optical signals emitted by the LED after the optical signals are blocked by the light shielding member may be different in all directions. In this embodiment of this application, a position and the shape of the light shielding member may be designed, so that a maximum emergent angle of an optical signal is the smallest on the plane that passes through the light emitting center of the LED and the center of the AA of the image sensor, for example, the above $\theta$.

In a possible design, a value of θ is taken near a half of a beam angle 2γ of the LED.

θ is taken within a range greater than γ, more optical signals

θ is relatively large, a distance between the image sensor and the LED is prolonged (which may be learned from a formula of calculating a center distance L shown below), and energy received by the image sensor is reduced. When the maximum emergent angle θ is within a range less than or equal to γ, a loss of energy received by the image sensor may be reduced, but energy arriving at the finger may be reduced. Therefore, the position and the shape of the light shielding member may be designed, so that the maximum emergent angle θ of the optical signal is designed to be γ or a value near γ on the plane that passes through the light emitting center of the LED and the center of the AA of the image sensor. In this way, a balance between energy arriving at the finger and energy arriving at the image sensor is achieved, so that definition of the fingerprint image can be greatly improved.

With reference to the first aspect, in some implementations of the first aspect, a distance L between the light emitting center of the LED and the center of the AA of the image sensor meets L≥h×tan θ+d/tan θ'+d×tan β'+t×tan β, where h represents a distance between the light emitting surface of the LED and the lower surface of the screen assembly, d represents a distance between an upper surface and the lower surface of the screen assembly, t represents a distance between the photosensitive surface of the image sensor and the lower surface of the screen assembly, θ is a predefined value and represents a maximum emergent angle that can be reached after an optical signal emitted by the LED is shielded by the light shielding member on the plane that passes through the light emitting center of the LED and the center of the AA of the image sensor, θ' represents an emergent angle that is reached after an optical signal whose incident angle is θ is refracted on a surface of the screen assembly, β is ½ of a field of view of the image sensor, and β' represents an incident angle corresponding to an emergent angle β when an optical signal is refracted on the surface of the screen assembly.

The distance L between the light emitting center of the LED and the center of the AA of the image sensor may be referred to as a center distance. A result obtained through calculation by using h×tan θ+d×tan θ'+d×tan β'+t×tan β is a critical value $L_0$ of the center distance L. When the center distance L is less than the critical value $L_0$, more stray light may enter the image sensor, and interference to the fingerprint optical signal is caused, which is not conducive to obtaining of a clear fingerprint image. When the center distance L is greater than the critical value $L_0$, fewer fingerprint optical signals enter the image sensor, optical signals entering the image sensor are reduced, and light intensity is weakened, which is also not conducive to obtaining of a clear fingerprint image.

Further, if a system tolerance is considered, the distance L between the light emitting center of the LED and the center of the AA of the image sensor meets L≥h×tan θ+d×tan θ'+d×tan β'+t×tan β+Δ, where Δ represents the system tolerance.

The system tolerance may be, for example, an empirical value, or may be determined based on a size of a system (the system may be the fingerprint recognition module in this embodiment of this application), an assembly position in the electronic device, a cooperation relationship between assembly members, and the like. A specific value and a determining manner of the system tolerance Δ are not limited in this application.

With reference to the first aspect, in some implementations of the first aspect, the light shielding member is a mechanical part with a light-through hole, and a hole wall of the light-through hole surrounds optical signals emitted by the LED, to block a part of the optical signals emitted by the LED.

The light shielding member may block an optical signal in one direction, or may block optical signals from all around. When the light shielding member blocks optical signals from all around, the light shielding member may be designed as the mechanical part with the light-through hole. The hole wall of the light-through hole faces the LED, and the optical signals emitted by the LED are surrounded. Therefore, only a part of optical signals with relatively small emergent angles can be emitted from the light-through hole, and a part of optical signals with relatively large emergent angles are blocked by the light shielding member.

With reference to the first aspect, in some implementations of the first aspect, a surface that is of the light shielding member and that surrounds an optical signal of the LED is coated with a light absorbing material, or the light shielding member is made of a light absorbing material.

When the light shielding member is configured to block an optical signal, the optical signal may be, for example, blocked in a manner of absorbing the optical signal. Therefore, a surface that is of the light shielding member and that surrounds light of the LED (namely, a surface facing the LED) may be coated with the light absorbing material, or the light shielding member is made of the light absorbing material, to achieve an effect of absorbing the optical signal.

With reference to the first aspect, in some implementations of the first aspect, the light shielding member is integrated into a middle frame of the electronic device. The middle frame is located between the screen assembly and the fingerprint recognition module, and the middle frame has a light-through hole in a region corresponding to the LED. A hole wall of the light-through hole surrounds optical signals emitted by the LED, to block a part of the optical signals emitted by the LED.

In other words, a function of the light shielding member may be implemented by the middle frame of the electronic device. Specifically, the light-through hole may be provided in the region corresponding to the LED in the middle frame, so that the hole wall of the light-through hole can surround the optical signals emitted by the LED, to achieve an effect of blocking a part of the optical signals emitted by the LED. A position of the light-through hole of the middle frame may be designed with reference to the above center distance L. A hole depth of the light-through hole of the middle frame may be designed with reference to the predefined maximum emergent angle θ and an aperture.

With reference to the first aspect, in some implementations of the first aspect, the fingerprint recognition module is carried on a holder, and is fastened below the screen assembly by using the holder. The holder includes a primary compartment and a secondary compartment. The primary compartment is configured to accommodate the image sensor. The secondary compartment is configured to accommodate the LED, the light shielding member is integrated into the secondary compartment, and the secondary compartment is a light-through hole that penetrates a thickness direction of the holder. The light-through hole corresponds to a region of the LED, and a hole wall of the light-through hole surrounds optical signals emitted by the LED, to block a part of the optical signals emitted by the LED.

Specifically, the holder may be configured to carry the fingerprint recognition module. In an assembly process, the holder may be cooperated with the middle frame of the electronic device, to fasten, below the screen assembly, the fingerprint recognition module carried by the holder. A function of the light shielding hole may be alternatively implemented by the holder. The secondary compartment of the holder may be designed as the light-through hole that penetrates the thickness direction of the holder, and the hole wall of the light-through hole may surround the optical signals emitted by the LED, to achieve an effect of blocking a part of the optical signals $\theta$ and an aperture.

According to a second aspect, an electronic device is provided. The electronic device includes a screen assembly and a fingerprint recognition module. The fingerprint recognition module includes an LED, an image sensor, and a light shielding member. A light emitting surface of the LED is opposite to a lower surface of the screen assembly and is used to emit an optical signal. The image sensor is located on one side of the LED, and a photosensitive surface of the image sensor is opposite to the lower surface of the screen assembly and is used to receive an optical signal. The optical signal received by the image sensor includes a fingerprint optical signal returned after being emitted by the LED to a finger, and the fingerprint optical signal is used to generate a fingerprint image. The light shielding member is partially or entirely located between the LED and the image sensor, to block a part of optical signals emitted by the LED.

The fingerprint optical signal may be an optical signal that carries fingerprint information. In this embodiment of this application, fingerprint optical signals include an optical signal that is emitted by the LED to the inside of the finger and that is scattered and refracted after being propagated through the inside of the finger, and an optical signal that is emitted by the LED to a surface of the finger and that is reflected by the surface of the finger.

Correspondingly, in the optical signals emitted by the LED, when a part of the optical signals pass through a surface of the screen assembly, the optical signals arrive at the image sensor through one or more reflections. This part of optical signals do not arrive at the finger, and do not carry the fingerprint information. Therefore, interference to the fingerprint optical signal is caused. In this embodiment of this application, an optical signal that arrives at the image sensor and that does not carry the fingerprint information is referred to as a stray optical signal.

The screen assembly may be an LCD screen, or may be an OLED screen. This is not limited in this application.

Therefore, according to the electronic device provided in this embodiment of this application, the fingerprint recognition module is disposed below the screen assembly, to implement optical under-display fingerprint recognition. The light shielding member is disposed in a region near the LED, and large-angle emergent light emitted by the LED is blocked, so that stray light that arrives at the image sensor through at least one reflection on the surface of the screen assembly is reduced. In this way, interference from the stray light to the fingerprint optical signal can be reduced, or in other words, interference from the stray light to the fingerprint information is reduced, thereby improving definition of the fingerprint image.

With reference to the second aspect, in some implementations of the second aspect, on a plane that passes through a light emitting center of the LED and a center of an active area AA of the image sensor, the light shielding member is configured to block an optical signal whose emergent angle is greater than $\theta$ and that is emitted by the LED, where $\theta$ is a predefined value.

In other words, the light shielding member is disposed near the LED, so that signal light emitted by the LED can be controlled to be within an angle range.

Because a shape of the light shielding member is not limited in this application, the light shielding member may block, in one direction, an optical signal emitted by the LED, or may block optical signals emitted by the LED. Therefore, maximum emergent angles of optical signals emitted by the LED after the optical signals are blocked by the light shielding member may be different in all directions. In this embodiment of this application, a position and the shape of the light shielding member may be designed, so that a maximum emergent angle of an optical signal is the smallest on the plane that passes through the light emitting center of the LED and the center of the AA of the image sensor, for example, the above $\theta$.

In a possible design, a value of $\theta$ is taken near a half of a beam angle $2\gamma$ of the LED.

Radiation intensity of light is related to an emergent angle. Therefore, when the value of the maximum emergent angle $\theta$ is taken within a range greater than $\gamma$, more optical signals may be included, or in other words, more energy may be included. However, if the maximum emergent angle $\theta$ is relatively large, a distance between the image sensor and the LED is prolonged, and energy received by the image sensor is reduced. When the maximum emergent angle $\theta$ is within a range less than or equal to $\gamma$, a loss of energy received by the image sensor may be reduced, but energy arriving at the finger may be reduced. Therefore, the position and the shape of the light shielding member may be designed, so that the maximum emergent angle $\theta$ of the optical signal is designed to be $\gamma$ or a value near $\gamma$ on the plane that passes through the light emitting center of the LED and the center of the AA of the image sensor. In this way, a balance between energy arriving at the finger and energy arriving at the image sensor is achieved, so that definition of the fingerprint image can be greatly improved.

With reference to the second aspect, in some implementations of the second aspect, a distance L between the light emitting center of the LED and the center of the AA of the image sensor meets $L \geq h \times \tan\theta + d \times \tan\theta' + d \times \tan\beta' + t \times \tan\beta$, where h represents a distance between the light emitting surface of the LED and the lower surface of the screen assembly, d represents a distance between an upper surface and the lower surface of the screen assembly, t represents a distance between the photosensitive surface of the image sensor and the lower surface of the screen assembly, $\theta$ is a predefined value and represents a maximum emergent angle that can be reached after an optical signal emitted by the LED is shielded by the light shielding member on the plane that passes through the light emitting center of the LED and the center of the AA of the image sensor, $\theta'$ represents an emergent angle that is reached after an optical signal whose incident angle is $\theta$ is refracted on a surface of the screen assembly, $\beta$ is ½ of a field of view of the image sensor, and $\beta'$ represents an incident angle corresponding to an emergent angle $\beta$ when an optical signal is refracted on the surface of the screen assembly.

The distance L between the light emitting center of the LED and the center of the AA of the image sensor may be referred to as a center distance. A result obtained through calculation by using $h \times \tan\theta + d \times \tan\theta' + d \times \tan\beta' + t \times \tan\beta$ is a critical value $L_0$ of the center distance L. When the center distance L is less than the critical value $L_0$, more stray light may enter the image sensor, and interference to the fingerprint optical signal is caused, which is not conducive to obtaining of a clear fingerprint image. When the center distance L is greater than the critical value $L_0$, fewer fingerprint optical signals enter the image sensor, optical signals entering the image sensor are reduced, and light intensity is weakened, which is also not conducive to obtaining of a clear fingerprint image.

Further, if a system tolerance is considered, the distance L between the light emitting center of the LED and the center of the AA of the image sensor meets $L \geq h \times \tan \theta + d \times \tan \theta' + d \times \tan \beta' + t \times \tan \beta + \Delta$, where $\Delta$ represents the system tolerance.

The system tolerance may be, for example, an empirical value, or may be determined based on a size of a system (the system may be the fingerprint recognition module in this embodiment of this application), an assembly position in the electronic device, a cooperation relationship between assembly members, and the like. A specific value and a determining manner of the system tolerance $\Delta$ are not limited in this application.

With reference to the second aspect, in some implementations of the second aspect, the light shielding member is a mechanical part with a light-through hole, and a hole wall of the light-through hole surrounds optical signals emitted by the LED, to block a part of the optical signals emitted by the LED.

The light shielding member may block an optical signal in one direction, or may block optical signals from all around. When the light shielding member blocks optical signals from all around, the light shielding member may be designed as the mechanical part with the light-through hole. The hole wall of the light-through hole faces the LED, and the optical signals emitted by the LED are surrounded. Therefore, only a part of optical signals with relatively small emergent angles can be emitted from the light-through hole, and a part of optical signals with relatively large emergent angles are blocked by the light shielding member.

With reference to the second aspect, in some implementations of the second aspect, the electronic device further includes a middle frame, the middle frame is located between the screen assembly and the fingerprint recognition module, the light shielding member is integrated into the middle frame, and the middle frame has a light-through hole in a region corresponding to the LED. A hole wall of the light-through hole surrounds optical signals emitted by the LED, to block a part of the optical signals emitted by the LED.

In other words, a function of the light shielding member may be implemented by the middle frame of the electronic device. Specifically, the light-through hole may be provided in the region corresponding to the LED in the middle frame, so that the hole wall of the light-through hole can surround the optical signals emitted by the LED, to achieve an effect of blocking a part of the optical signals emitted by the LED. A position of the light-through hole of the middle frame may be designed with reference to the above center distance L. A hole depth of the light-through hole of the middle frame may be designed with reference to the predefined maximum emergent angle $\theta$ and an aperture.

With reference to the second aspect, in some implementations of the second aspect, the electronic device further includes a holder, the fingerprint recognition module is carried on the holder, and the holder fastens the fingerprint recognition module below the screen assembly. The holder includes a primary compartment and a secondary compartment. The primary compartment accommodates the sensor. The light shielding member and the secondary compartment have an all-in-one design, the secondary compartment accommodates the LED, and the secondary compartment is a light-through hole that penetrates a thickness direction of the holder. The light-through hole corresponds to a region of the LED, and a hole wall of the light-through hole surrounds optical signals emitted by the LED, to block a part of the optical signals emitted by the LED.

Specifically, the holder may be configured to carry the fingerprint recognition module. In an assembly process, the holder may be cooperated with the middle frame of the electronic device, to fasten, below the screen assembly, the fingerprint recognition module carried by the holder. A function of the light shielding hole may be alternatively implemented by the holder. The secondary compartment of the holder may be designed as the light-through hole that penetrates the thickness direction of the holder, and the hole wall of the light-through hole may surround the optical signals emitted by the LED, to achieve an effect of blocking a part of the optical signals emitted by the LED. The secondary compartment of the holder may be designed with reference to the above center distance L. A wall thickness of the secondary compartment (or a hole depth of the light-through hole) may be designed with reference to the predefined maximum emergent angle $\theta$ and an aperture.

With reference to the second aspect, in some implementations of the second aspect, blackening processing is performed on the hole wall and a hole end face of the light-through hole, to absorb a received optical signal.

Blackening processing is performed on the hole wall and the hole end face of the light-through hole, so that the hole wall and the hole end face of the light-through hole have a function of absorbing an optical signal, thereby achieving an effect of blocking emission of a large-angle optical signal.

With reference to the second aspect, in some implementations of the second aspect, the screen assembly includes a substrate, the substrate is located at a bottom layer of the screen assembly, a lower surface of the substrate is opposite to the fingerprint recognition module, and blackening processing is performed on an upper surface and the lower surface of the substrate, to absorb a received optical signal.

A part of optical signals with relatively small emergent angles can be incident into the screen assembly through the light shielding member, but are reflected a plurality of times between the upper surface or the lower surface of the screen assembly and each layer of interface of the screen assembly, and finally arrive at the image sensor. This part of reflected light does not arrive at the finger, and does not carry the fingerprint information. Therefore, interference to the fingerprint information is caused. This part of reflected light is also a part of the above stray light.

In this embodiment of this application, blackening processing is performed on the upper surface and the lower surface of the substrate at the bottom of the screen assembly, to absorb an optical signal reflected on a surface of the substrate, thereby greatly reducing stray light, and reducing interference from the stray light to the fingerprint information. In this way, definition of the fingerprint image is further improved.

With reference to the first aspect or the second aspect, in some implementations, the fingerprint recognition module includes a plurality of LEDs, a plurality of light shielding members corresponding to the plurality of LEDs, and one image sensor. The plurality of LEDs and the plurality of light shielding members corresponding to the plurality of LEDs are uniformly distributed around the image sensor, and each light shielding member is partially or entirely located between a corresponding LED and the image sensor.

A quantity of LEDs, a quantity of light shielding members, and a quantity of image sensors included in the fingerprint recognition module are not limited in this application. In an embodiment, the fingerprint recognition module may include one image sensor, a plurality of LEDs, and a light shielding member used in cooperation with the plurality of LEDs. The plurality of LEDs and the light shielding member may be uniformly distributed around the image sensor, so that an optical signal arriving at the image sensor has relatively uniform light intensity. A center distance L between each LED and the image sensor may be designed with reference to the above formula of calculating the center distance L.

It should be understood that uniform distribution of the plurality of LEDs and the plurality of light shielding members on the image sensor is merely a possible implementation, and shall not constitute any limitation on this application. Alternatively, the plurality of LEDs and the plurality of light shielding members may be non-uniformly distributed around the image sensor. In addition, there may be alternatively a plurality of image sensors. This is not limited in this application.

With reference to the first aspect or the second aspect, in some implementations, the LED is an infrared LED.

Because the infrared LED has relatively strong penetration force, an optical signal may arrive at the finger through the screen assembly, to implement optical under-display fingerprint recognition. However, it should be understood that use of the infrared LED is merely a possible implementation, and this application does not exclude a possibility of using another light source that can provide relatively strong penetration force to implement optical under-display fingerprint recognition.

With reference to the first aspect or the second aspect, in some implementations, the fingerprint recognition module further includes at least one lens, the at least one lens is located between the screen assembly and the image sensor, and an imaging center of the at least one lens coincides with the center of the AA of the image sensor. The at least one lens is configured to receive optical signals, and the optical signals received by the at least one lens arrive at the image sensor after being converged.

The at least one lens is added between the screen assembly and the image sensor, so that the optical signals arriving at the lens arrive at the image sensor after being converged by the lens. Therefore, an optical signal received by the image sensor is stronger, so that a clear fingerprint image can be obtained.

With reference to the first aspect or the second aspect, in some implementations, a distance L' between the light emitting center of the LED and the imaging center of the at least one lens meets $L' \geq h \times \tan\theta + d \times \tan\theta' + d \times \tan\alpha' + t' \times \tan\alpha + CA/2$, where h represents a distance between the light emitting surface of the LED and the lower surface of the screen assembly, d represents a distance between an upper surface and the lower surface of the screen assembly, t' represents a distance between a surface on which an out-light hole of the at least one lens is located and the lower surface of the screen assembly. θ is a predefined value and represents a maximum emergent angle that can be reached after an optical signal emitted by the LED is shielded by the light shielding member on the plane that passes through the light emitting center of the LED and the center of the AA of the image sensor, θ' represents an emergent angle that is reached after an optical signal whose incident angle is θ is refracted on a surface of the screen assembly, CA represents a diameter of the out-light hole of the at least one lens, α is ½ of a field of view of the at least one lens, and α' represents an incident angle corresponding to an emergent angle α when an optical signal is refracted on the surface of the screen assembly.

Based on the above limitation on the center distance L, after the at least one lens is added, some modifications may be made to the formula of calculating the center distance L, to adapt to a scenario in which the lens is added. Herein, L' is defined only for distinguishing from the formula of calculating L, and L' represents the distance between the light emitting center of the LED and the imaging center of the lens. Because the imaging center of the lens coincides with the center of the AA of the image sensor, L' may also represent the distance between the light emitting center of the LED and the center of the AA of the image sensor.

Further, if a system tolerance is considered, the distance L' between the light emitting center of the LED and the imaging center of the at least one lens meets $L' \geq h \times \tan\theta + d \times \tan\theta' + d \times \tan\alpha' + t' \times \tan\alpha + CA/2 + \Delta$, where Δ represents the system tolerance.

The system tolerance may be, for example, an empirical value, or may be determined based on a size of a system (the system may be the fingerprint recognition module in this embodiment of this application), an assembly position in the electronic device, a cooperation relationship between assembly members, and the like. A specific value and a determining manner of the system tolerance Δ are not limited in this application.

According to a third aspect, a screen assembly is provided. The screen assembly is applied to an electronic device provided with a fingerprint recognition module, the fingerprint recognition module includes a light emitting diode LED and an image sensor, and a lower surface of the screen assembly is opposite to a light emitting surface of the LED and a photosensitive surface of the image sensor. The screen assembly includes a substrate and a reflective film. The substrate and the reflective film are arranged in a stacked manner in a direction perpendicular to the light emitting surface of the LED, and the substrate is located below the reflective film. The screen assembly has one or more optical signal processing layers, and the one or more optical signal processing layers are located between an upper surface of the substrate and a lower surface of the reflective film, and/or are located on a lower surface of the substrate. The one or more optical signal processing layers are configured to process a received optical signal, to reduce a reflection on the received optical signal.

With reference to the third aspect, in some implementations of the third aspect, the one or more optical signal processing layers include a scattering particle.

The scattering particle may scatter the received optical signal, so that the reflection on the received optical signal can be effectively reduced.

Optionally, the one or more optical signal processing layers include ink, and the ink includes the scattering particle.

Further, through a spraying or plating process, the scattering particle may be attached to at least one of the following surfaces: the upper surface of the substrate, the lower surface of the substrate, and the lower surface of the reflective film.

It should be understood that being attached to at least one of the upper surface of the substrate, the lower surface of the substrate, and the lower surface of the reflective film means that the above one or more optical signal processing layers are located between the upper surface of the substrate and the lower surface of the reflective film, and/or are located on the lower surface of the substrate.

It may be understood that, because opening processing needs to be performed on a region that is in the substrate and that is corresponding to the LED and the image sensor, when the scattering particle is attached to the upper surface and/or the lower surface of the substrate, interface processing probably cannot be performed on the region in which the opening processing is performed.

With reference to the third aspect, in some implementations of the third aspect, the one or more optical signal processing layers are located between the upper surface of the substrate and the lower surface of the reflective film.

In a possible design, the one or more optical processing signal layers include one layer of linear polarizer and one layer of quarter-wave plate, and the linear polarizer is closer to the upper surface of the substrate than the quarter-wave plate.

After optical signals from the LED pass through the linear polarizer and the quarter-wave plate, a part of optical signals through an interface 1 may pass through the quarter-wave plate again after being reflected by an interface above the interface 1, and phases of the optical signals are rotated by 90 degrees. Therefore, this part of reflected optical signals do not enter the linear polarizer, and thus do not enter the image sensor. Therefore, the linear polarizer and the quarter-wave plate may be configured to isolate reflected light above the reflective film.

Optionally, the linear polarizer and the quarter-wave plate are located on a region that is between the upper surface of the substrate and the lower surface of the reflective film and that is corresponding to the LED.

Because costs of the linear polarizer and the quarter-wave plate are relatively high, the linear polarizer and the quarter-wave plate may be used in partial regions, to effectively utilize the linear polarizer and the quarter-wave plate.

Optionally, the linear polarizer and the quarter-wave plate are placed flat between the substrate and the reflective film.

Optionally, the linear polarizer and the quarter-wave plate are attached to the lower surface of the reflective film through a plating process.

In another possible design, the one or more optical signal processing layers include a light uniformizing film.

The light uniformizing film may transmit an optical signal emitted by the LED, and has a scattering characteristic, so that a reflection on a received optical signal by the lower surface of the reflective film and the upper surface of the substrate can be reduced.

Optionally, the light uniformizing film is laid flat between the substrate and the reflective film.

With reference to the third aspect, in some implementations of the third aspect, at least one of the one or more optical signal processing layers includes a light absorbing material.

The light absorbing material may absorb a part of stray light, thereby reducing reflected light.

Optionally, the at least one layer including the light absorbing material is attached to at least one of an interface 2 and an interface 3 through a spraying or plating process.

It should be understood that, because opening processing needs to be performed on a region that is in the substrate and that is corresponding to the LED and the image sensor, when the light absorbing material is attached to the upper surface and/or the lower surface of the substrate, the light absorbing material may be disposed only in the region in which the opening processing is performed, or may be disposed on an entire interface. This is not limited in this application.

With reference to the third aspect, in some implementations of the third aspect, the one or more optical signal processing layers include at least one layer of scattering particle, one layer of linear polarizer, and one layer of quarter-wave plate; or at least one layer of scattering particle and at least one layer of light uniformizing film; or at least one layer of light absorbing material, at least one layer of scattering particle, one layer of linear polarizer, and one layer of quarter-wave plate; or at least one layer of light absorbing material, at least one layer of scattering particle, and at least one layer of light uniformizing film.

In other words, the foregoing plurality of possible optical signal processing layers may be used in combination if no conflict occurs.

According to a fourth aspect, an electronic device is provided, including the screen assembly in any one of the third aspect and the possible implementations of the third aspect, and a fingerprint recognition module. The fingerprint recognition module includes an LED and an image sensor. A light emitting surface of the LED is opposite to a lower surface of the screen assembly and is used to emit an optical signal. The image sensor is located on one side of the LED, and a photosensitive surface of the image sensor is opposite to the lower surface of the screen assembly and is used to receive an optical signal. The optical signal received by the image sensor includes a fingerprint optical signal returned after being emitted by the LED to a finger, and the fingerprint optical signal is used to generate a fingerprint image.

With reference to the fourth aspect, in some implementations of the fourth aspect, the fingerprint recognition module further includes a light shielding member, and the light shielding member is partially or entirely located between the LED and the image sensor, to block a part of optical signals emitted by the LED.

The fingerprint recognition module included in the electronic device may be the fingerprint recognition module in any one of the first aspect and the possible implementations of the first aspect.

DESCRIPTION OF EMBODIMENTS

Figure 1:
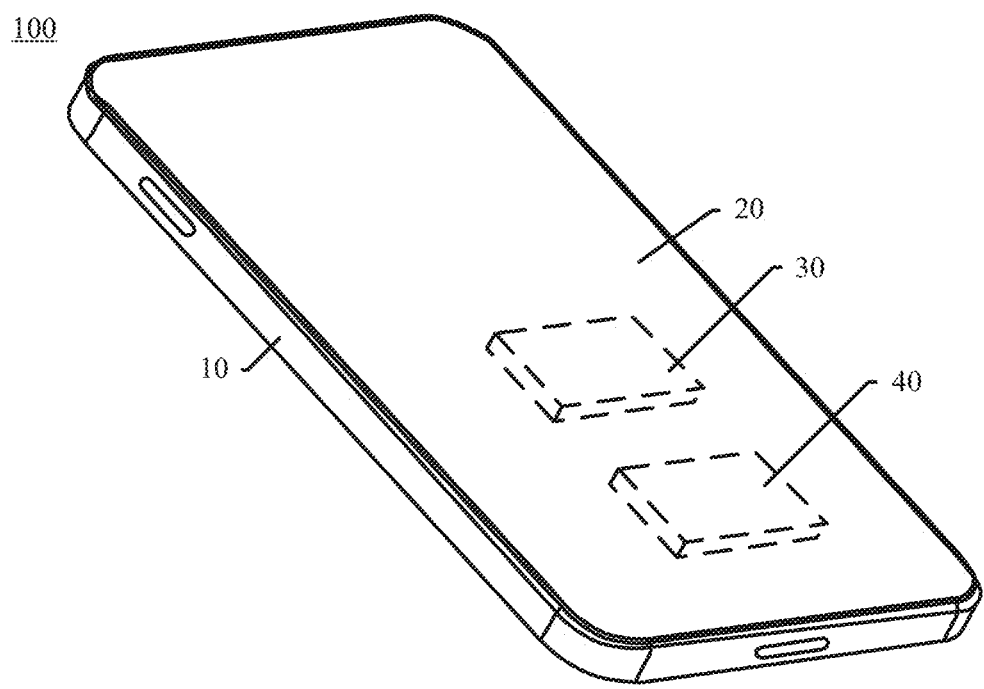
FIG. 1 is a schematic structural diagram of an electronic device according to an embodiment of this application.

The following describes technical solutions of this application with reference to accompanying drawings.

For ease of understanding of the embodiments of this application, the following descriptions are first provided.

First, for ease of understanding, the following describes in detail a fingerprint recognition module and an electronic device provided in this application with reference to a plurality of accompanying drawings. However, these accompanying drawings are merely examples for ease of understanding. Relative distances between components shown in the figures, and shapes and sizes of the components are not necessarily the same as those of real objects or scaled proportionally.

Second, in the embodiments of this application, designs of sizes are involved in many cases, and these designs are all based on considerations in an ideal state. Therefore, a size obtained through a design may be referred to as a basic size. In contrast, a size obtained after machining and assembly may be referred to as an actual size. There is a specific size deviation between the basic size and the actual size. However, as long as a deviation between these sizes falls within a range of a tolerance, these sizes shall fall within the protection scope of this application. The tolerance is an allowable variation of an actual parameter value. The tolerance and the basic size may be used to define two threshold values that allow the actual size to change, namely, limit sizes. In addition, a specific value of the tolerance may be predefined. The specific value of the tolerance is not limited in this application.

Third, the following describes in detail the fingerprint recognition module provided in this application with reference to a plurality of accompanying drawings. For ease of description, in the plurality of accompanying drawings, a surface on which a screen assembly is located is used as a reference surface to describe a relative position relationship between components. Although the screen assembly includes a plurality of layers, an upper surface and a lower surface of the screen assembly are parallel or approximately parallel.

In the following embodiments, for ease of understanding and description, a plane parallel to the screen assembly is denoted as an xoy plane, and being parallel to the screen assembly described in this specification may indicate being parallel to the xoy plane. A direction perpendicular to the screen assembly is denoted as a z direction, and being perpendicular to the screen assembly described in this specification may indicate a plane passing through the z direction, for example, a yoz plane or an xoz plane.

In addition, a cross section in the direction perpendicular to the screen assembly is described in many cases in the following embodiments. In the embodiments of this application, the cross section in the direction perpendicular to the screen assembly is a cross section that passes through a light emitting center of an LED and an imaging center of a lens in a lens module in the direction perpendicular to the screen assembly, for example, a yoz plane shown in a plurality of accompanying drawings below.

It should be understood that these descriptions and definitions are merely for ease of description and understanding, and shall not constitute any limitation on this application. The accompanying drawings in this application are merely intended to more clearly describe a relative position relationship between the fingerprint recognition module and each component in the fingerprint recognition module, and a relative position relationship between the fingerprint recognition module and another component in the electronic device. Therefore, a placement direction of each component shown in the figures imposes no limitation on placement directions of the fingerprint recognition module and the electronic device provided with the fingerprint recognition module in a use process.

Fourth, in the embodiments of this application, for ease of understanding, a plurality of accompanying drawings show optical path diagrams in which an optical signal is emitted by an LED to a finger, then is returned to the screen assembly after being propagated inside the finger, and finally is received by a sensor. These optical path diagrams are merely illustrative for ease of understanding, and shall not constitute any limitation on this application. A quantity of optical signals entering the finger, a direction of an optical path, and the like are not limited in this application.

Similarly, a plurality of accompanying drawings further show optical path diagrams in which an optical signal is reflected by the screen assembly to the sensor. These optical path diagrams are merely illustrative for ease of understanding, and shall not constitute any limitation on this application. A quantity of optical signals reflected by the screen assembly, a direction of an optical path, and the like are not limited in this application.

Fifth, in the embodiments of this application, "at least one" may represent one or more. "A plurality of" means two or more than two.

In addition, for ease of understanding of the embodiments of this application, terms in this application are first briefly described.

1. Beam angle (beam angle): The beam angle is an included angle formed by two sides at a position at which light intensity reaches 10% or 50% of light intensity in a normal line is a beam angle, or an included angle between optical signals whose light intensity is 10% or 50% of maximum light intensity. For ease of description below, the beam angle is denoted as 2γ, and an optical signal whose emergent angle is γ may form a right cone whose vertex is a light emitting center of a light source. An angle formed by the right cone on any interface perpendicular to a bottom surface of the cone is the beam angle 2γ.

For example, if the beam angle is defined as an included angle formed by two sides at a position at which light intensity reaches 50% of the light intensity in the normal line, when an emergent angle of light reaches a half γ of the beam angle, intensity of an optical signal emitted along the emergent angle is 50% of light intensity of the light emitting center.

A light emitting angle of an infrared LED is generally large, and a beam angle ranges from 300 to 140°. If the beam angle is defined as an included angle formed by two sides at a position at which light intensity reaches 50% of the light intensity in the normal line, a beam angle 30° may mean that when an emergent angle of an optical signal emitted by the infrared LED is 15°, light intensity of the optical signal is 50% of light intensity of a light emitting center of the infrared LED, and a beam angle 140° may mean that when the emergent angle of the optical signal emitted by the infrared LED is 70°, the light intensity of the optical signal is 50% of the light intensity of the light emitting center of the infrared LED.

2. Field of view (field of view, FOV): The field of view is referred to as an angle of view (angle of view), and is an included angle formed by using a lens of an optical instrument as a vertex and by using two edges of a maximum range in which an image of a to-be-detected object can pass through the lens. The field of view is used to measure an angle range for receiving an image by a photosensitive element.

The following describes the embodiments of this application in detail.

FIG. 1 is a schematic structural diagram of an electronic device 100 according to an embodiment of this application. The electronic device 100 may be, for example, a mobile phone, a tablet computer, an e-reader, a notebook computer, a vehicle-mounted device, or a wearable device. In FIG. 1, an example in which the electronic device 100 is a mobile phone is used to briefly describe a structure of the electronic device.

The electronic device 100 includes a housing 10 and a screen assembly 20. The housing 10 may be configured to protect the electronic device. The housing 10 may specifically include a middle frame and a rear cover. The middle frame may include a bezel exposed outside the electronic device 100 and an internal panel surrounded by the bezel. The middle frame is usually made of a metal material to ensure good mechanical strength of the middle frame. The screen assembly 20 is mounted above the internal panel, and the rear cover is mounted below the internal panel. The bezel surrounds peripheral edges of the rear cover and the screen assembly 20. In other words, the screen assembly 20 and the rear cover are separately mounted on two sides of the middle frame. When a user uses the electronic device 100, the screen assembly 20 usually faces the user, and the rear cover faces away from the user.

The electronic device 100 further includes a control module 30. The control module 30 is accommodated in the electronic device 100, and is covered with the middle frame, the rear cover, and the screen assembly 20. The control module 30 may include at least one communications interface, a bus, at least one processor, and at least one memory. The at least one communications interface, the at least one processor, and the at least one memory may communicate with each other through the bus. The at least one communications interface is configured to receive and send data. The screen assembly 20 may be connected to one or more communications interfaces, so that the control module 30 can start a drive unit in a drive circuit 205, to trigger a drive signal.

In this embodiment of this application, the electronic device 100 further includes a fingerprint recognition module 40. The fingerprint recognition module 40 is accommodated in the electronic device 100, is located below the screen assembly 20, and is covered with the middle frame, the rear cover, and the screen assembly 20. The fingerprint recognition module 40 may be configured to: collect an optical signal, and generate a fingerprint image based on the received optical signal. In some possible designs, the fingerprint recognition module 40 is integrated into the screen assembly 20, and is a part of the screen assembly 20. In other words, the screen assembly 20 may include the fingerprint recognition module 40. In some other possible designs, the fingerprint recognition module 40 and the screen assembly 20 may be two modules independent of each other, and the screen assembly 20 may not include the fingerprint recognition module 40. This is not limited in this application. In the following embodiments, for ease of understanding and description only, the fingerprint recognition module 40 and the screen assembly 20 are defined as two independent modules.

The fingerprint recognition module 40 may be connected to one or more communications interfaces, to transmit the fingerprint image to the processor. The at least one memory is configured to store program code. The program code includes code for fingerprint recognition. The at least one processor may be configured to execute the foregoing application program code. For example, the at least one processor can execute the code for fingerprint recognition, to implement fingerprint recognition.

Figure 2:
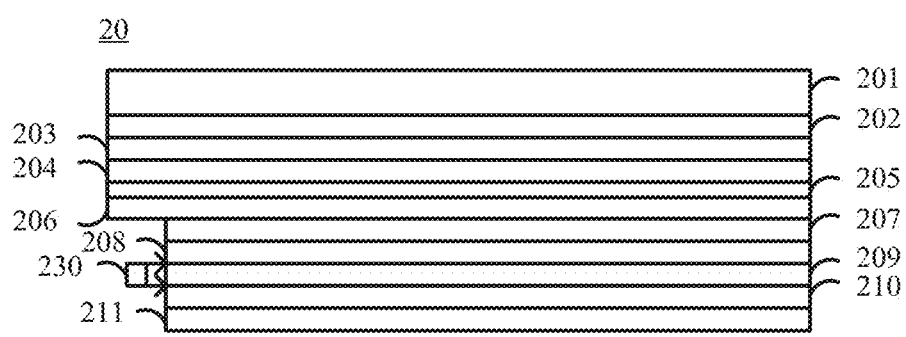
FIG. 2 is a schematic structural diagram of a screen assembly used for an electronic device.

FIG. 2 is a schematic structural diagram of the screen assembly 20 used for the electronic device according to an embodiment of this application. In FIG. 2, a structure of the screen assembly 20 of the electronic device 100 shown in FIG. 1 is further described. The screen assembly 20 may include, for example, a cover glass (cover glass, CG) 201, an upper polarizer 202, a color film substrate 203, a liquid crystal (liquid crystal, LC) layer 204, a drive circuit 205, a lower polarizer 206, a light emitting diode (LED) 230 for providing a light source, an antireflective film 207, a light uniformizing layer 208, a light guide layer 209, a reflective film 210, and a substrate 211. The foregoing layers are disposed in a stacked manner. The foregoing assemblies may be assembled by using, for example, an optically clear adhesive (optically clear adhesive, OCA) material. The reflective film 210 and the substrate 211 may block light from being irradiated into the electronic device 100 through the screen assembly 20. The substrate 211 may include, for example, an iron frame. The antireflective film 207, the light uniformizing layer 208, the light guide layer 209, the reflective film 210, the substrate 211, and the LED 230 may constitute one backlight module, to provide a uniform planar light source for the screen assembly 20.

The LED 230 serves as a light source to provide an optical signal. The light guide layer 209 uniformly disperses, to an entire plane, optical signals incident from the LED 230. The light uniformizing layer 208 makes the optical signals more uniform. The antireflective film 207 improves transmission strength of an optical signal emitted by the antireflective film 207.

The upper polarizer 202 and the lower polarizer 206 that are stacked on two sides of the liquid crystal layer 204 are configured to change a polarization characteristic of an optical signal. The drive circuit 205 disposed between the liquid crystal layer 204 and the lower polarized light 206 controls liquid crystal at the liquid crystal layer 204 to be transparent or opaque, that is, controls whether light incident from the antireflective film 207 passes through the liquid crystal layer 204 to arrive at a region outside the screen assembly 20 and to be received by human eyes.

A plurality of drive units may be disposed on the drive circuit 205. For example, one drive unit may be one or more thin film transistors (thin film transistor, TFT). A power-on state of the drive unit may be controlled by controlling the drive circuit 205, to control a transparent state of the liquid crystal at the liquid crystal layer 204. Specifically, when the drive circuit 205 controls the drive unit to be powered on, an optical signal from the LED 230 may pass through the light guide layer 209, the light uniformizing layer 208, the antireflective film 207, the lower polarizer 206, the liquid crystal layer 204, the color film substrate 203, the upper polarizer 202, and the cover 201, to arrive at the region outside the screen assembly 20.

It should be understood that the TFT listed above is merely a possible form of the drive unit, and shall not constitute any limitation on this application.

Figure 3:
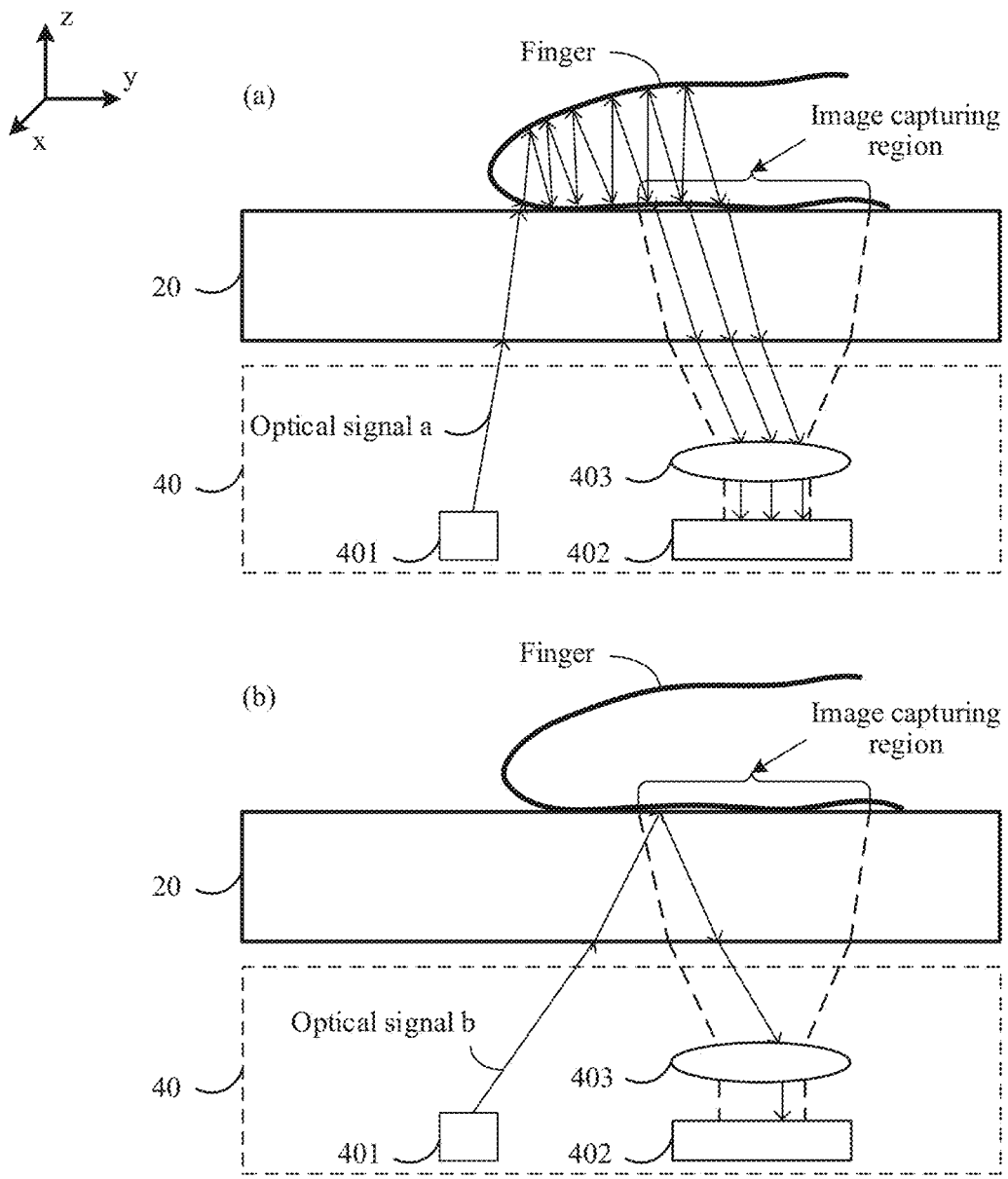
FIG. 3 is a schematic diagram of obtaining fingerprint information by a fingerprint recognition module.

FIG. 3 is a schematic diagram of obtaining fingerprint information by the fingerprint recognition module. As shown in FIG. 3, the fingerprint recognition module 40 may be deployed below a screen assembly. The fingerprint recognition module 40 may provide an optical signal used to obtain fingerprint information, and receive an optical signal returned by a finger, to obtain fingerprint information of the finger. The screen assembly may be, for example, the screen assembly 20 shown in FIG. 2, or may be different from the screen assembly 20 shown in FIG. 2. This is not limited in this application.

As shown in FIG. 3, the fingerprint recognition module 40 may include at least one LED 401 and at least one image sensor (a sensor for short below) 402. A light emitting surface of the LED 401 is opposite to a lower surface of the screen assembly 20 and is used to emit an optical signal. Optionally, the LED 401 is an infrared (infrared ray, IR) LED. Certainly, the LED 401 may be another light source that can provide an optical signal with relatively strong penetration force. This is not limited in this application. The sensor 402 is located on one side of the LED, and a photosensitive surface of the sensor 402 is also opposite to the lower surface of the screen assembly 20 and is used to receive an optical signal.

It should be noted that, because the LED 401 may be configured to provide an optical signal with relatively strong penetration force, the optical signal may penetrate the screen assembly 20 to arrive at the finger, and the above reflective film 210 in the screen assembly 20 does not have a significant reflection effect on an optical signal emitted by the LED 401. More precisely, the reflective film 210 is a transmission mode for the LED 401. In addition, because the substrate 211 located at a bottom layer of the screen assembly 20 is opaque, an optical signal may be blocked from propagating in a direction above the screen assembly 20. If it is expected that an optical signal penetrates the screen assembly 20 to enter the finger, opening processing may be performed at a position corresponding to the LED 501, so that the optical signal can penetrate the screen assembly 20 to be propagated upward. Similarly, if it is expected that an optical signal returned by the finger penetrates the screen assembly 20 to arrive at the sensor 402, opening processing may be performed at a position corresponding to the sensor 402, so that the optical signal can penetrate the screen assembly 20 to be propagated downward.

Because opening processing is performed on the substrate 211 at the bottom layer of the screen assembly 20, a lower surface of the screen assembly 20 at the position corresponding to the LED 401 is not a lower surface of the substrate 211, but another layer exposed on the lower surface of the screen assembly 20 after the substrate 211 is removed, for example, the reflective film 210 shown in FIG. 2. Therefore, a lower surface that is of the screen assembly and that is obtained after the opening processing is performed on the substrate 211 of the screen assembly 20 may be referred to as a backlight surface. Because the backlight surface is located at the bottom of the screen assembly 20, the backlight surface may also be referred to as a backlight bottom. The backlight bottom is opposite to an upper surface of the LED 401 and an upper surface of the sensor 402. The backlight bottom is not necessarily entirely composed of the substrate of the screen assembly 200, and is partially composed of another layer above the substrate. The lower surface of the screen assembly 20 described below may be understood based on the foregoing descriptions. For brevity, details are not described again below.

In addition, the opening processing is specifically described below, and detailed descriptions of the opening processing are omitted herein.

The following briefly describes a specific process in which the fingerprint recognition module 40 provided in this embodiment of this application obtains the fingerprint information.

When the finger is placed on the screen assembly 20, optical signals from the LED 401 are irradiated on the finger through the screen assembly 20. A part of the optical signals may enter the inside of the finger for propagation through a skin surface of the finger, and the optical signals may be propagated inside the finger through scattering, refraction, or the like. In the optical signals propagated inside the finger, a part of the optical signals may return to the screen assembly 20 through refraction and scattering of the skin surface, and finally arrive at the sensor 402. Fingerprints of the finger may include a ridge (or referred to as a ridge line) and a valley (or referred to as a valley line), and the optical signals arriving at the sensor 402 may produce a brightness difference. Therefore, the fingerprints of the finger may be extracted. For example, a brighter optical signal arriving at the sensor 402 may correspond to the ridge of the finger, and a darker optical signal arriving at the sensor 402 may correspond to the valley of the finger. Therefore, optical signals read by the sensor 402 are optical signals returned by the finger, and the optical signals may mainly include an optical signal that is emitted by the LED 401 to the inside of the finger and that is refracted and scattered after being propagated through the inside of the finger. Certainly, the optical signals may further include a part of optical signals reflected after being emitted by the LED 401 to the surface of the finger.

A region that is on an upper surface of the screen assembly 20 and that is used to receive optical signals returned by the finger (for example, the optical signals may include the above refracted light, scattered light, and reflected light) may be referred to as an image capturing region. In other words, an optical signal returned by the finger may enter the screen assembly 20 through the image capturing region on the upper surface of the screen assembly 20, and then arrive at the sensor 402. The optical signal arriving at the sensor 402 may be used to obtain the fingerprint information, and the optical signal used to obtain the fingerprint information may be converted into an electrical signal, to generate a fingerprint image. The fingerprint image is a representation form of the fingerprint information. The fingerprint image may be sent to a processor, for example, the at least one processor in the control module 30 shown in FIG. 1 above, to implement fingerprint recognition.

For ease of description below, an optical signal that is emitted by the LED to the inside of the finger and that is scattered and refracted after being propagated through the inside of the finger and an optical signal that is emitted by the LED to the surface of the finger and that is reflected by the surface of the finger are collectively referred to as fingerprint optical signals. Simply, the fingerprint optical signal is an optical signal that carries the fingerprint information. The fingerprint optical signal may be used to obtain the fingerprint information to generate the fingerprint image. It may be understood that, when fingerprint optical signals are propagated downward through the screen assembly, the fingerprint optical signals may be reflected at an interface, and a part of the optical signals are lost. In other words, not all optical signals returned by the surface of the finger necessarily arrive at the sensor. However, collection of the fingerprint optical signal by the sensor is not affected.

It should be understood that the image capturing region shown in FIG. 3 is merely for ease of understanding, and shall not constitute any limitation on a size of the image capturing region. In a process of collecting the fingerprint information, the surface of the finger may be in contact with the image capturing region, to accurately obtain the fingerprint information of the finger.

In addition, for ease of understanding, FIG. 3 schematically shows a relative position relationship among the image capturing region, the sensor 402, and the LED 401, and an optical path in which an optical signal (for example, an optical signal a in (a) in FIG. 3) is emitted by the LED 401 to the screen assembly 20, is returned to the screen assembly 20 after being propagated in the finger, and then is emitted to the sensor. As described above, optical signals received by the sensor 402 are optical signals returned by the finger, and may specifically include an optical signal that is emitted by the LED 401 to the inside of the finger and that is refracted and scattered after being propagated through the inside of the finger, and an optical signal reflected after being emitted by the LED 401 to the surface of the finger. The optical signal a shown in (a) in FIG. 3 is an example of the fingerprint optical signal. As shown in the figure, the optical signal a enters the inside of the finger after being refracted by the surface of the finger. After scattering occurs inside the finger, a part of optical signals return to the screen assembly 20, and a large part of optical signals entering the image capturing region on the screen assembly 20 may arrive at the sensor, to generate the fingerprint image.

It should be understood that (a) in FIG. 3 merely schematically shows a direction of an optical path in which an optical signal is emitted by the LED to the inside of the finger and is returned by the finger after being propagated. This application constitutes a limitation on an actual propagation path of an optical signal, a quantity of optical signals incident inside the finger, and the like. In addition, for brevity, (a) in FIG. 3 does not show a direction of an optical path in which the optical signal a is emitted by the LED to the surface of the finger and is reflected to the sensor. However, this shall not constitute any limitation on this application.

Optionally, the fingerprint recognition module 40 further includes at least one lens 403. The at least one lens 403 may include, for example, a 3-piece lens (3pieces lens, 3p Lens). The lens herein may be, for example, a convex lens. The at least one lens 403 may be disposed between the sensor 402 and the screen assembly 20. An imaging center of the at least one lens 403 coincides with a center of an active area (active area, AA) on the photosensitive surface of the sensor 402. The at least one lens 403 may be configured to receive fingerprint optical signals, and the optical signals arrive at the sensor 402 after being converged by the at least one lens 403. Therefore, the at least one lens 403 is disposed between the sensor 402 and the screen assembly 20, so that the optical signals can be converged to the sensor 402, thereby improving definition of the fingerprint image.

It should be understood that for ease of understanding only. FIG. 3 schematically shows one convex lens. However, this shall not constitute any limitation on this application. A quantity and types of lenses included in the at least one lens 403 are not limited in this application. In addition, for ease of understanding, FIG. 3 shows, by using dashed lines, a field of view of the lens 403 and a region that an optical signal incident into the screen assembly 20 along a direction of the field of view can arrive at.

In a process in which an optical signal is emitted by the LED 401 and is propagated outwards by using the screen assembly 20, the optical signal may be emitted through an interface. For example, the optical signal may be reflected at the cover glass 201 of the screen assembly 20. For another example, the optical signal is reflected at an interface inside the screen assembly 20, for example, reflected at an interface between the lower polarizer 206 and the antireflective film 207. Reflected light may enter the image capturing region due to a relatively large incident angle, or may enter the image capturing region through a plurality of reflections at the interface, thereby interfering with obtaining of the fingerprint information.

For example, for an optical signal b shown in (b) in FIG. 3, when the optical signal b is reflected on an upper surface of the cover glass 201 of the screen assembly 20, because an incident angle of the optical signal b is relatively large, a reflected optical signal enters the image capturing region. Light intensity of the reflected optical signal is relatively large, and strong light leakage may occur on the sensor 402.

Figure 4:
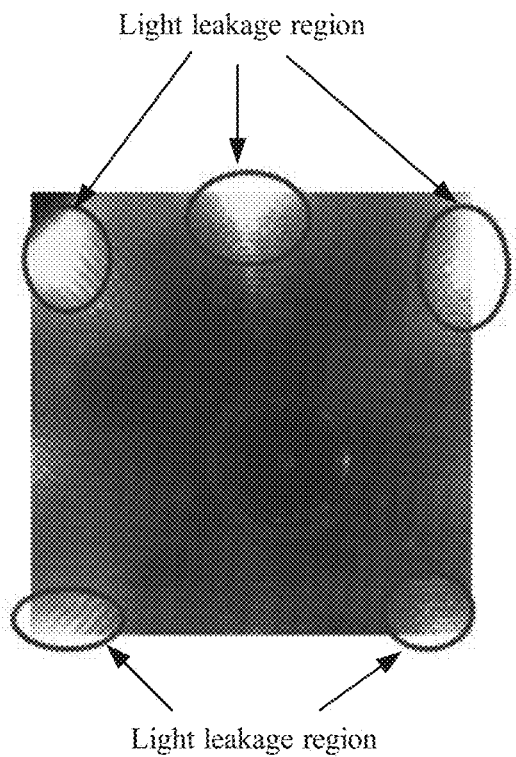
FIG. 4 is a schematic diagram of a light leakage phenomenon.

FIG. 4 shows a light leakage phenomenon caused when a reflected optical signal enters an image capturing region. FIG. 4 is a schematic diagram obtained after a test target above the screen assembly 20 receives an optical signal from the LED 401. Because a part of optical signals are reflected on the screen assembly 20, but fail to penetrate the screen assembly 20 to arrive at the test target, a light leakage phenomenon occurs. It may be learned from FIG. 4 that light leakage causes partial overexposure of an image on the test target, and an area that is in the image and that is used to recognize fingerprint information is partially lost. Consequently, it is not conducive to obtaining of information about each region of a fingerprint of a finger, and collection of the fingerprint information is affected.

Figure 17:
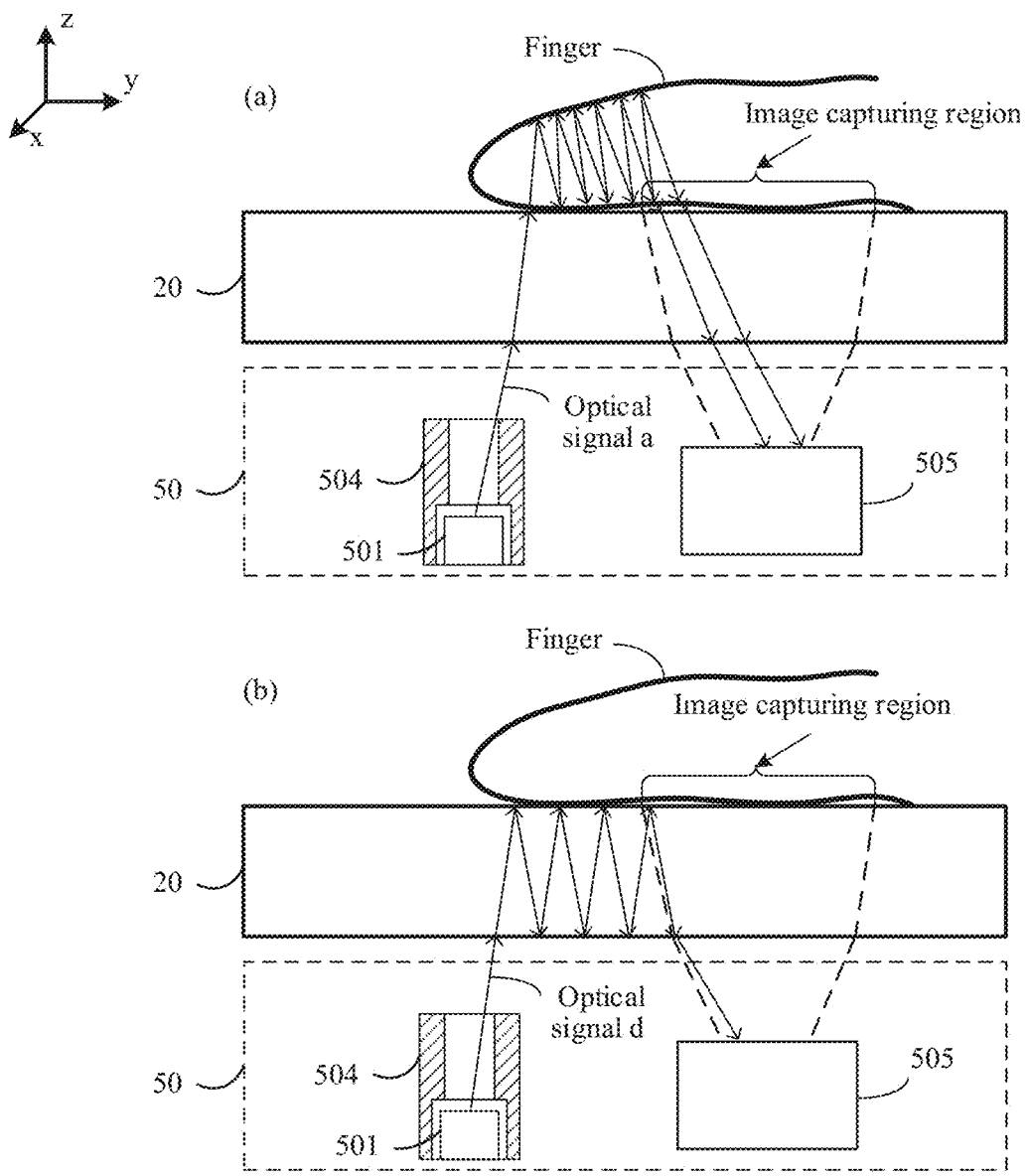
FIG. 17 is a schematic diagram of stray light that arrives at a lens module through a plurality of reflections according to an embodiment of this application.

In this embodiment of this application, for ease of description, an optical signal that arrives at the sensor after being reflected by a surface of the screen assembly and an interface between layers inside the screen assembly is referred to as stray light. The stray light interferes with an optical signal that is returned by the finger and that arrives at the sensor, affects obtaining of the fingerprint information, and affects definition of a fingerprint image. As a result, a fingerprint recognition effect may be affected. It should be understood that the reflection described herein is not limited to one reflection, and some optical signals may also arrive at the sensor through a plurality of reflections. As shown in FIG. 17 below, these optical signals are also a part of stray light.

In view of this, this application provides a fingerprint recognition module, to reduce interference from stray light, thereby reducing impact on fingerprint information and improving definition of a fingerprint image.

The following describes in detail the fingerprint recognition module provided in this embodiment of this application with reference to the accompanying drawings. It should be understood that the fingerprint recognition module provided in this application is not limited to the LCD screen shown in FIG. 2 above, and may be alternatively applied to an OLED screen. In other words, the screen assembly described in this embodiment of this application may be an LCD screen, or may be an OLED screen. An application scope of the one fingerprint recognition module is not limited in this application.

Figure 5:
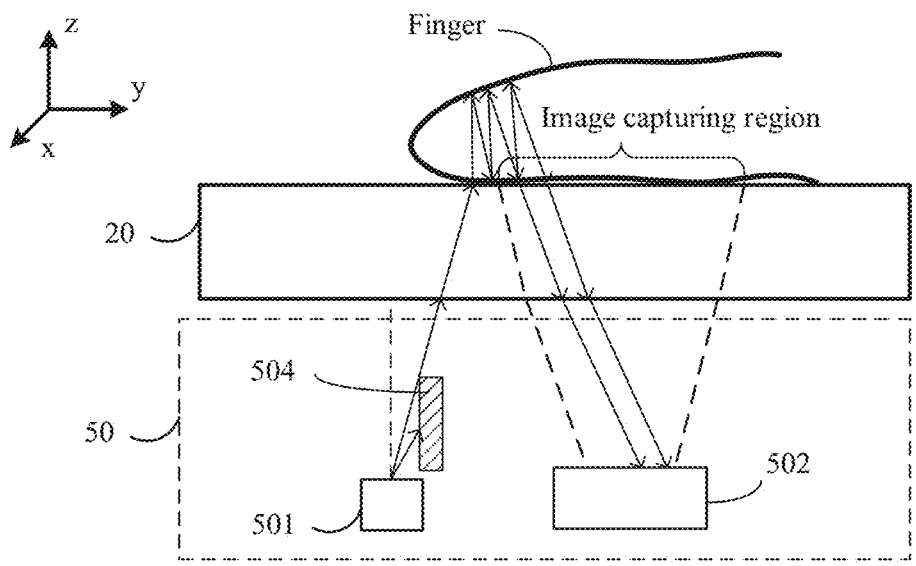
FIG. 5 is a schematic diagram of a fingerprint recognition module according to an embodiment of this application.

FIG. 5 is a schematic diagram of a fingerprint recognition module according to an embodiment of this application. FIG. 5 specifically shows a fingerprint recognition module 50. The fingerprint recognition module 50 may include at least one LED 501, at least one sensor 502, and at least one light shielding member. It should be understood that the figure is merely an example, and shows one LED 501, one sensor 502, and one light shielding member 504. However, this shall not constitute any limitation on this application. Quantities of LEDs, sensors, and light shielding members are not limited in this application.

Specifically, a light emitting surface of the LED 501 is opposite to a lower surface of a screen assembly 20 and is used to emit an optical signal in a direction of the screen assembly 20. The sensor 502 is located on one side of the LED 501. A photosensitive surface of the sensor 502 is opposite to the lower surface of the screen assembly 20 and may be used to receive an optical signal. The optical signal received by the sensor 502 may include a fingerprint optical signal returned after being emitted by the LED 501 to a finger, to generate a fingerprint image. For ease of understanding, FIG. 5 shows, by using dashed lines, a field of view of the sensor 502 and a region that an optical signal incident into the screen assembly 20 along a direction of the field of view can arrive at.

The light shielding member 504 is disposed in a region near the LED 501. The light shielding member 504 is partially or entirely located between the LED 501 and the sensor 502, to block a part of optical signals emitted by the LED 501. FIG. 5 shows an example in which the light shielding member 504 is entirely located between the LED 501 and the sensor 502. However, this shall not constitute any limitation on this application. For example, FIG. 9 and FIG. 11 to FIG. 17 below all are schematic diagrams in which the light shielding member 504 is partially located between the LED 501 and the sensor 502.

The light shielding member 504 is disposed in the region near the LED 501, and large-angle emergent light emitted by the LED is blocked, so that stray light that arrives at the sensor 502 through at least one reflection on a surface of the screen assembly 20 is reduced. In this way, interference from the stray light to the fingerprint optical signal can be reduced, or in other words, interference from the stray light to fingerprint information is reduced, thereby improving definition of the fingerprint image.

Based on the foregoing design, on a plane that passes through a light emitting center of the LED 501 and a center of an AA of the sensor 501, an emergent angle of an optical signal emitted by the LED 501 is less than or equal to the above predefined angle θ. In other words, on the plane that passes through the light emitting center of the LED 501 and the center of the AA of the sensor 501, the light shielding member 504 may be configured to block an optical signal that is emitted by the LED 501 and whose emergent angle is greater than θ. In other words, on the plane that passes through the light emitting center of the LED 501 and the center of the AA of the sensor 501, a maximum emergent angle of an optical signal that is emitted by the LED 501 and that is blocked by the light shielding member 504 is θ.

θ may be taken near a half of a beam angle 2γ of the LED 501, that is, the predefined angle θ

θ is taken within a range greater than γ, more optical signals may be included, or in other words, more energy may be included. However, if the maximum emergent angle θ is relatively large, a distance between the image sensor and the LED is prolonged (which may be learned from a formula of calculating a center distance L shown below), and energy received by the image sensor is reduced. When the maximum emergent angle θ is within a range less than or equal to γ, a loss of energy received by the image sensor may be reduced, but energy arriving at the finger may be reduced. Therefore, the position and the shape of the light shielding member may be designed, so that the maximum emergent angle θ of the optical signal is designed to be γ or a value near γ on the plane that passes through the light emitting center of the LED and the center of the AA of the image sensor. In this way, a balance between energy arriving at the finger and energy arriving at the image sensor is achieved, so that definition of the fingerprint image can be greatly improved.

It should be understood that a relationship between radiation intensity of a light source and an emergent angle and related descriptions of a beam angle are described in detail above. For brevity, details are not described herein again.

In addition, a maximum emergent angle of the LED described below may be a maximum value of an emergent angle that can be reached after an optical signal emitted by the LED is blocked by the light shielding member. For brevity, descriptions of a same or similar case are omitted below.

It should be noted that an upper surface of the LED 501 shown in FIG. 5 is opposite to the lower surface of the screen assembly 20. In other words, the upper surface of the LED 501 is the light emitting surface. An upper surface of the sensor 502 is opposite to the lower surface of the screen assembly 20. In other words, the upper surface of the sensor 502 is the photosensitive surface. In the following embodiments, when the upper surface of the LED is described, the upper surface may be considered as the light emitting surface of the LED, and when the upper surface of the sensor is described, the upper surface may be considered as the photosensitive surface of the sensor.

Optionally, the fingerprint recognition module 50 further includes at least one lens, the at least one lens is located between the screen assembly 20 and the sensor 502, and an imaging center of the at least one lens coincides with the center of the AA of the sensor 502. The at least one lens may be configured to receive optical signals, and the optical signals arrive at the sensor 502 after being converged by the at least one lens. In other words, the at least one lens may be used in cooperation with one sensor.

In a possible design, the sensor and the at least one lens may be defined as a lens module, that is, the lens module includes the sensor. In another possible design, the at least one lens may be defined as a lens module, that is, the lens module and the sensor are separately defined. In this application, the sensor and the at least one lens are defined as the lens module. However, it should be understood that this is merely a difference in definition, and shall not constitute any limitation on this application.

As described above, the at least one lens is configured to converge light, to obtain a fingerprint image with relatively high definition. In other words, even if the fingerprint recognition module does not include a lens, the sensor may generate a fingerprint image based on a received optical signal. Therefore, the fingerprint recognition module may not include the at least one lens, but include only the sensor. A plurality of embodiments with reference to the accompanying drawings below are merely examples. A plurality of schematic diagrams of the fingerprint recognition module are shown by using an example in which the fingerprint recognition module includes the lens module. If the fingerprint recognition module does not include the at least one lens, the lens module may be replaced with the sensor below unless otherwise specified.

Figure 6:
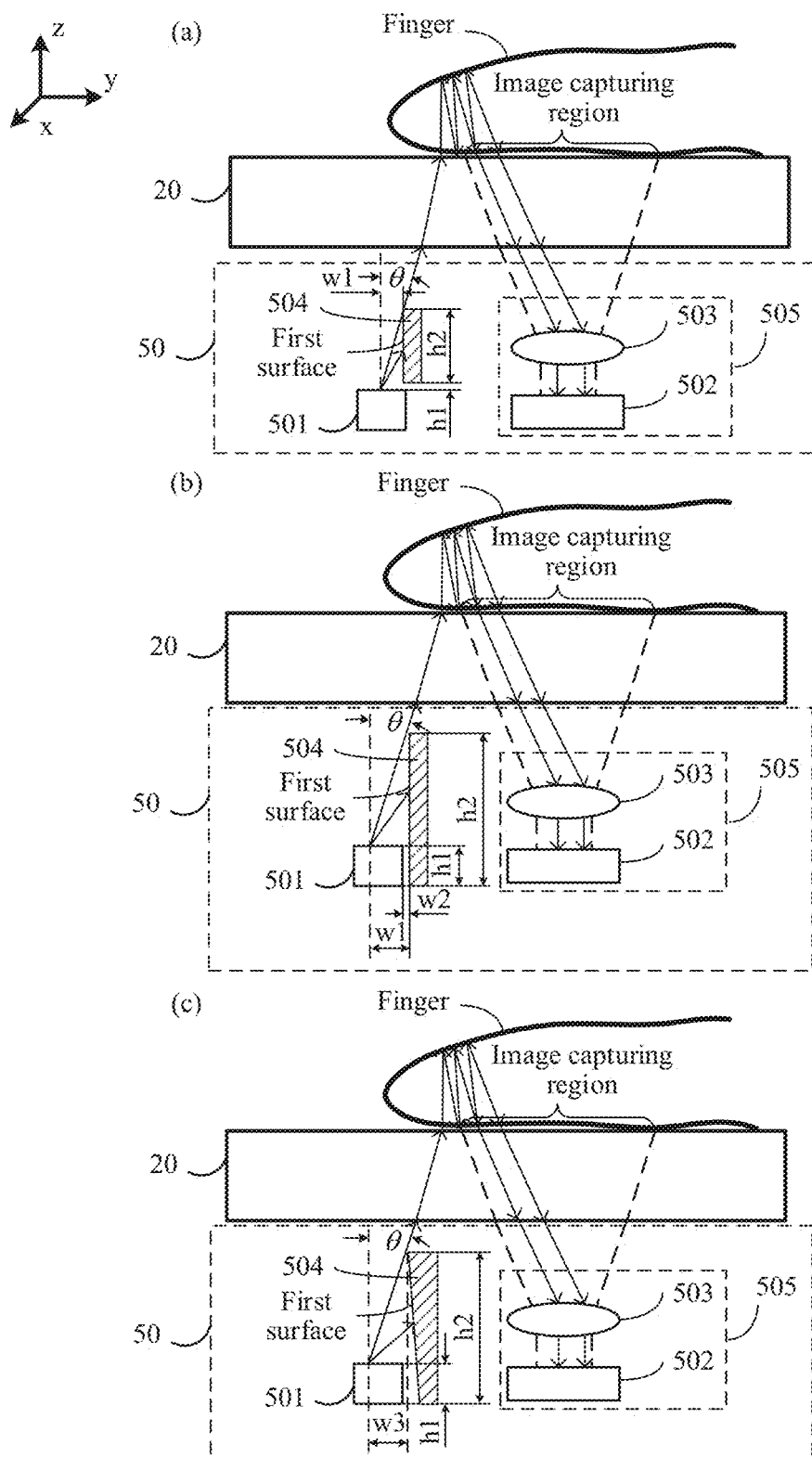
FIG. 6 is another schematic diagram of a fingerprint recognition module according to an embodiment of this application.

To describe the fingerprint recognition module provided in this embodiment of this application more clearly, the following further describes the fingerprint recognition module with reference to several examples in FIG. 6.

FIG. 6 is another schematic diagram of a fingerprint recognition module according to an embodiment of this application. FIG. 6 specifically shows several examples of the fingerprint recognition module 50. Specifically, the fingerprint recognition module 50 may include at least one LED 501, at least one lens module 505, and at least one light shielding member 504. Each lens module 505 may include one sensor 502 and at least one lens 503. For the at least one LED 501, the at least one lens module 505, and the at least one light shielding member 504, refer to the above related descriptions with reference to FIG. 5. For ease of understanding, FIG. 6 shows, by using dashed lines, a field of view of the lens 503 in the lens module 505 and a region that an optical signal incident into a screen assembly 20 along a direction of the field of view can arrive at.

The LED 501 may be configured to provide a light source. A light emitting surface of θ). For ease of differentiation and description, the side surface that is of the light shielding member 504 and that faces the LED 501 is denoted as a first surface, and an optical signal whose emergent angle is greater than the predefined angle θ is denoted as large-angle emergent light.

Optionally, the first surface of the light shielding member 504 is coated with a light absorbing material. Alternatively, optionally, the light shielding member 504 is made of a light absorbing material. A specific preparation process and a material of the light shielding member 504 are not limited in this application, provided that the surface that is of the light shielding member 504 and that faces the LED 501 has a light absorbing function.

In this embodiment of this application, the fingerprint recognition module 50 includes one LED 501 and one lens module 505. The light shielding member 504 may be designed to absorb an optical signal whose emergent angle is greater than the predefined angle and that is close to the lens module 505, to reduce large-angle emergent light from the LED 501, thereby preventing a large quantity of optical signals from interfering with the fingerprint optical signal when the optical signals arrive at the lens module 505 after being reflected by the screen assembly 20. Therefore, the light shielding member 504 may be designed to block large-angle emergent light of the LED 501 in a direction (for example, a direction close to the lens module 505), or may be designed to block a part of large-angle emergent light of the LED 501. Alternatively, the light shielding member 504 may be designed to block large-angle emergent light of the LED 501 in all directions, or may be designed to block all large-angle emergent light of the LED 501.

(a) to (c) in FIG. 6 show several examples of the light shielding member 504. The light shielding member 504 shown in FIG. 6 may be configured to block large-angle emergent light of the LED 501 in a direction close to the sensor 502. Therefore, the light shielding member 504 may be in a shape of a flat plate, an arc plate, or the like. The following separately describes a relative position relationship between the LED 501 and the light shielding member 504 with reference to (a) to (c) in FIG. 6.

For ease of understanding and description, parameters in (a) and (b) in FIG. 6 are first defined as follows: A distance between a lower surface of the light shielding member 504 and an upper surface of the LED 501 is h1, a height of the light shielding member 504 is h2, a distance between a light emitting center of the LED 501 and the first surface of the light shielding member 504 is w1, and a minimum distance between a side surface that is of the LED 501 and that is close to the lens module and the first surface of the light shielding member 501 is w2.

In (a) in FIG. 6, the first surface of the light shielding member 504 is perpendicular to the upper surface of the LED 501. The light shielding member 504 is located in a region above the upper surface of the LED 501. There is a spacing between the lower surface of the light shielding member 504 and the upper surface of the LED 501, namely, the above h1. The spacing h1 may be designed based on reliability, to prevent the light shielding member 504 from colliding with the upper surface of the LED 501 and damaging the LED 501. Therefore, the spacing h1 may be greater than or equal to a safe avoidance distance $h_0$.

As described above, radiation intensity of an LED lamp is related to an emergent angle. In this embodiment of this application, it may be considered to control a maximum emergent angle θ that can be reached by an optical signal emitted by the LED 501 to be near a half γ of a beam angle of the LED. For example, if 2γ=30°, the maximum emergent angle θ is 15°.

It should be understood that a size of the predefined value θ may be artificially defined. θ=15° listed herein is merely an example, and shall not constitute any limitation on this application. A maximum emergent angle of an optical signal emitted by the LED 501 is controlled, so that an optical signal arriving at the lower surface of the screen assembly 20 in optical signals emitted by the LED 501 can be controlled to be within a relatively small range. In this way, an optical signal with a relatively large emergent angle is prevented from being reflected to the lens module 505 after being emitted to the screen assembly 20.

Based on the foregoing control on the maximum emergent angle, the height h2 of the light shielding member 504 may be further designed. In (a) in FIG. 6, w1/tan θ=h2+h1. Therefore, it may be determined that the height of the light shielding member meets h2=w1/tan θ−h1.

In (b) in FIG. 6, the first surface of the light shielding member 504 is perpendicular to the upper surface of the LED 501. The light shielding member 504 is located on one side of the LED 501, and a spacing is reserved between the first surface of the light shielding member 504 and a side surface of the LED 501. A minimum value of the spacing is the above w2, and w2 herein is referred to as a minimum distance because a shape of the LED 501 is not limited in this application. For example, the shape of the LED 501 may be a cylinder, a cube, a cuboid, or another irregular shape. When a side surface that is of the LED 501 and that is close to the sensor 502 is a plane, for example, when the shape of the LED 501 is a cube or a cuboid, a distance between the side surface and a first plane is fixed, namely, w2. When the side surface that is of the LED 501 and that is close to the sensor 502 is not a plane, for example, when the shape of the LED 501 is a cylinder, distances between points at different positions on the side surface that is of the LED 501 and that is close to the sensor 502 and the first surface may be different. In this case, w2 may be defined as a minimum distance between the side surface that is of the LED 501 and that is close to the sensor 502 and the first surface of the light shielding member 501.

The minimum distance w2 may also be designed based on reliability, to prevent the light shielding member 504 from colliding with the side surface of the LED 501 and damaging the LED 501. Therefore, the spacing w2 may also be greater than or equal to the safe avoidance distance $h_0$.

Based on the foregoing control on the maximum emergent angle, the height h2 of the light shielding member 504 may be further designed. In (b) in FIG. 6, w1/tan θ=h2−h1. Therefore, it may be determined that the height of the light shielding member meets h2=w1/tan θ+h1.

It should be understood that (a) and (b) shown in FIG. 6 are merely two possible designs of the relative position relationship between the LED 501 and the light shielding member 504, and shall not constitute any limitation on this application.

For example, the first surface of the light shielding member 504 is not necessarily perpendicular to the upper surface of the LED 501. As shown in (c) in FIG. 6, a shape of a cross section of the light shielding member 504 in a direction perpendicular to the screen assembly (for example, on a yoz plane) may be a trapezoid. That is, there is a tilt angle less than 90° between the first surface of the light shielding member 504 and the upper surface of the LED 501. When the first surface of the light shielding member 504 is not perpendicular to the upper surface of the LED 501, the safe avoidance distance between the light shielding member 504 and the LED 501 still needs to be considered. Because the first surface of the light shielding member 504 shown in (c) in FIG. 6 may collide with a side edge that is of the LED 501 and that is close to the lens module 505, a minimum distance between the side edge and the first surface may be designed to be greater than or equal to the safe avoidance distance.

Because there is a tilt angle less than 90° between the first surface of the light shielding member 504 and the upper surface of the LED 501, distances between different positions on the first surface and the light emitting center of the LED 501 are different. An intersecting line between the first surface of the light shielding member 504 and the upper surface is projected on the upper surface of the LED 501 or an extended surface of the upper surface of the LED 501, and a distance between the light emitting center and the projection may be determined, for example, denoted as w3. In this case, w3/tan θ=h2−h1. Therefore, it may be determined that h2=w3/tan θ+h1.

It should be understood that a relative position relationship between the first surface of the light shielding member 504 and the LED 501 shown in (c) in FIG. 6 is merely an example, and shall not constitute any limitation on this application. For example, an upper surface of the light shielding member 504 may be alternatively located above the upper surface of the LED 501. In this case, w3/tan θ=h2+h1. Therefore, it may be determined that h2=w3/tan θ−h1. In this case, h2 needs to be greater than or equal to the safe avoidance distance $h_0$.

It should be noted that, it may be learned from a relationship between w1 and h2 and a relationship between w3 and h2 shown above that a larger value of w1 or w3 indicates a larger value of h1 and a larger volume of the light shielding member. However, a volume of the light shielding member is limited by usable space in an electronic device. Therefore, the relative position relationship between the light shielding member and the LED may be designed based on the usable space.

It should be further understood that (a) to (c) in FIG. 6 show only examples of the cross section of the light shielding member 504 in the direction perpendicular to the screen assembly 20. The shape of the light shielding member 504 is not limited in this application.

Figure 7:
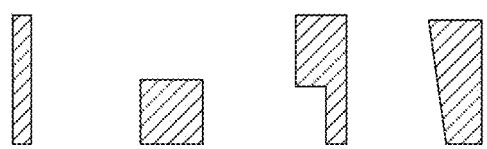
FIG. 7 is a schematic diagram of a light shielding member according to an embodiment of this application.
Figure 7:
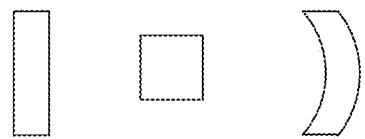

FIG. 7 shows a sectional view and a top view of the light shielding member 504.

(a) in FIG. 7 shows a sectional view of the light shielding member 504 in a direction perpendicular to the screen assembly 20. Specifically, a sectional view of the light shielding member 504 on a yoz plane is shown in the figure. As shown in the figure, a shape of a cross section of the light shielding member 504 on the yoz plane may be rectangular, square, stepped, trapezoidal, or the like. For brevity, examples are not enumerated herein one by one. However, it may be understood that, regardless of the shape of the cross section of the light shielding member 504 on the yoz plane, a maximum emergent angle of the LED 501 may be determined based on a position of an intersecting point between an upper surface of the light shielding member 504 and a first surface.

(b) in FIG. 7 shows a top view of the light shielding member 504 that is viewed downward in the direction perpendicular to the screen assembly 20. As shown in the figure, when viewed downward in the direction perpendicular to the screen assembly 20, the light shielding member 504 may be square, rectangular, arc-shaped, or the like. For brevity, examples are not enumerated herein one by one.

Based on the foregoing control on the maximum emergent angle of the LED, a relative position relationship between the sensor 502 and the LED 501 may be further designed. As described above, the sensor 502 does not expect to receive reflected light from the screen assembly 20, and therefore the sensor 502 may be placed as far away from the LED 501 as possible. However, if a distance between the sensor 502 and the LED 501 is excessively long, strength of a received fingerprint optical signal is relatively weak. Therefore, it is expected that the distance between the sensor 502 and the LED 501 can be determined, to achieve a balance between strength of a fingerprint optical signal and an amount of stray light.

Figure 8:
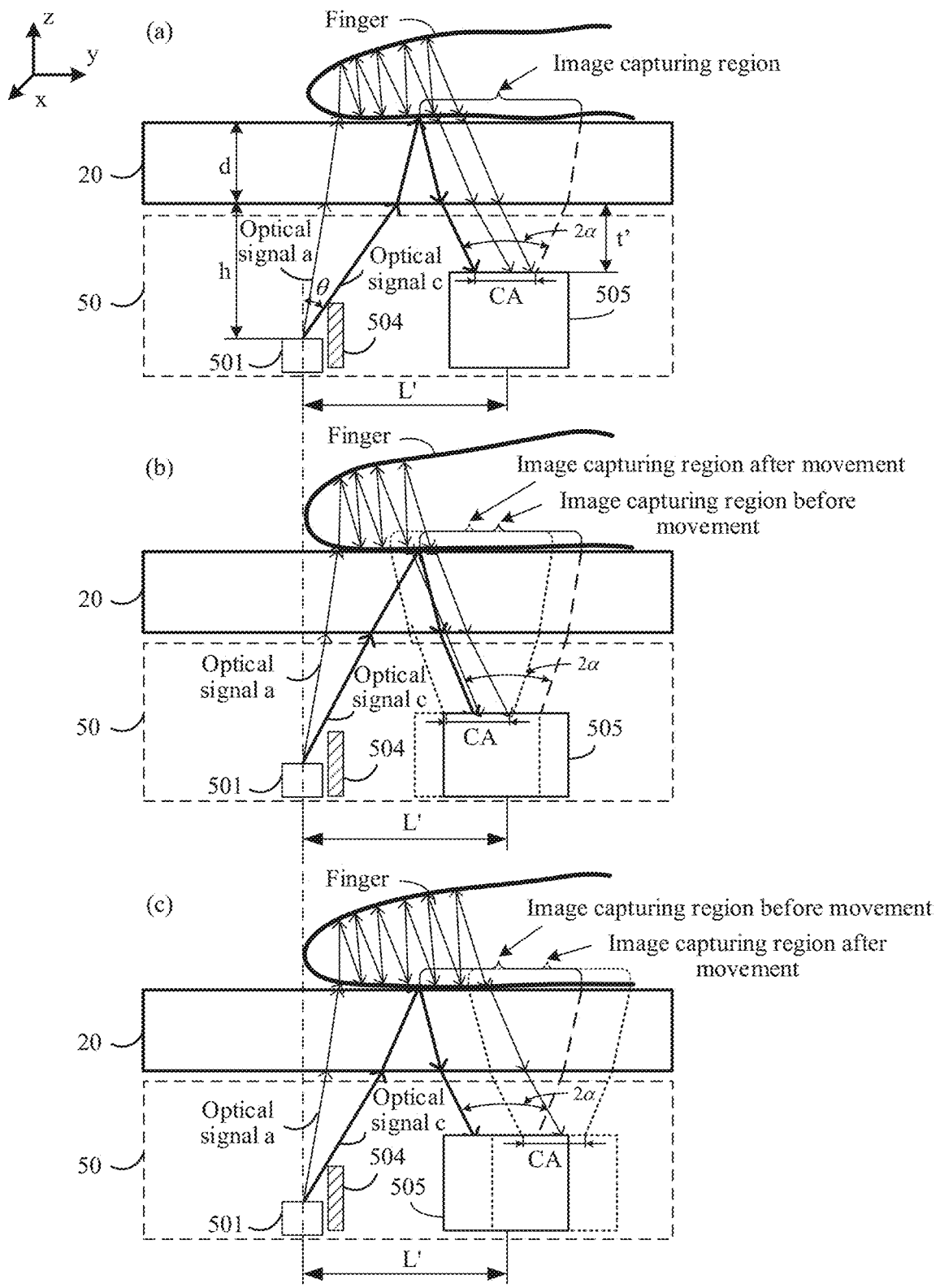
FIG. 8 is a schematic diagram of a relative position relationship between a sensor and an LED according to an embodiment of this application.

FIG. 8 further shows a relative position relationship between the lens module 505 and the LED 501. For brevity, the lens module 505 is shown as a whole in FIG. 8, and the at least one lens 503 and the sensor 502 are not separately shown. FIG. 8 specifically shows a relationship between a center distance L' between the lens module 505 and the LED 501 and each parameter. The center distance L' may be specifically a distance between a light emitting center of the LED 501 and a center of an imaging lens of a lens in the lens module 505. It should be understood that L is defined only for ease of understanding. Based on a same concept, a person skilled in the art may perform equivalent replacements or mathematical transformations on a definition of L'. These replacements or mathematical transformations shall fall within the protection scope of this application.

For ease of differentiation and description, it is assumed that a distance between an upper surface of the LED 501 and a lower surface of the screen assembly 20 is h. A diameter (or referred to as a clear aperture) of an out-light hole on a surface of the imaging lens of the lens in the lens module 505 is CA. An FOV of the imaging lens of the lens in the lens module 505 is 2α. A distance between a surface on which the out-light hole on the surface of the lens is located and the lower surface of the screen assembly 20 is t'. A distance between an upper surface and the lower surface of the screen assembly 20 is d. A maximum incident angle at which an optical signal emitted by the LED 501 arrives at the lower surface of the screen assembly 20 is related to a maximum emergent angle of the LED 501. In this embodiment, if the maximum emergent angle of the LED 501 is θ, the maximum incident angle at which the optical signal emitted by the LED 501 arrives at the lower surface of the screen assembly 20 is θ. Because the optical signal is refracted after entering the screen assembly 20, an incident angle at which the optical signal arrives at the upper surface of the screen assembly 20 changes, for example, denoted as θ'. In addition, because the FOV of the imaging lens of the lens in the lens module 505 is 2α, a maximum incident angle at which an optical signal emitted from the lower surface of the screen assembly 20 arrives at the lens module 505 is α. Due to a refraction phenomenon of the optical signal in different media, an incident angle at which the optical signal is incident from the upper surface of the screen assembly 20 to the lower surface is different from α, for example, denoted as α'. In other words, α' represents an incident angle corresponding to an emergent angle α when an optical signal is refracted on a surface of the screen assembly. It should be noted that when the lens module 505 includes a plurality of lenses, the out-light hole on the surface of the imaging lens of the lens in the lens module 505 may be, for example, an out-light hole on a surface of an imaging lens of a lens closest to the screen assembly 20. If the screen assembly 20 is located above the lens module 505, the lens closest to the screen assembly 20 may be an uppermost lens in the plurality of lenses included in the lens module 505. It should be understood that, that the out-light hole on the surface of the imaging lens of the lens closest to the screen assembly 20 is defined as the out-light hole on the surface of the imaging lens of the lens in the lens module 505 is merely a possible implementation, and shall not constitute any limitation on this application.

A critical point at which the lens module 505 may receive an optical signal from the screen assembly 20 is as follows: An optical signal emitted by the LED 501 enters the screen θ, and enters the lens module 505 at the incident angle θ. In other words, if the optical signal emitted by the LED 501 enters the screen assembly 20 at an incident angle less than θ, or is emitted from the screen assembly 20 at an emergent angle less than α, the lens module 505 cannot receive the optical signal.

In other words, L'≥tan θ+d×tan θ'+d×tan α'+t'×tan α+CA/2.

A value obtained through calculation after parameters on the right side in the foregoing formula are determined may be understood as a critical value of the center distance between the lens module 505 and the LED 501, for example, denoted as $L_0'$.

Further, if a system tolerance is considered, a distance L between the light emitting center of the LED and a center of an AA of the image sensor meets L'h×tan θ+d×tan θ'+d×tan α'+t'×tan α+CA/2+Δ, where Δ represents the system tolerance.

The system tolerance Δ may be, for example, an empirical value, or may be determined based on a size of a system (the system may be the fingerprint recognition module in this embodiment of this application), an assembly position in the electronic device, a cooperation relationship between assembly members, and the like. A specific value and a determining manner of the system tolerance Δ are not limited in this application.

As described above, optical signals that the lens module 505 expects to receive are optical signals returned by a finger, for example, an optical signal that is emitted by the LED 501 to the inside of the finger and that is refracted and scattered after being propagated through the inside of the finger, and an optical signal that is emitted by the LED 501 to a surface of the finger and that is reflected by the surface of the finger. The lens module 505 does not expect to receive optical signals emitted from the upper surface and the lower surface of the screen assembly 20 and a cross section inside the screen assembly 20. These optical signals are the above stray light, and cause interference to collection of fingerprint information.

For ease of understanding, with reference to (a), (b), and (c) in FIG. 8, the following describes in detail different impact on the fingerprint information when the center distance L' is equal to, less than, and greater than the critical value $L_0'$. In FIG. 8, for ease of differentiation and description, an optical signal a that can obtain the fingerprint information is shown by using a thin line, and an optical signal b that cannot obtain the fingerprint information is shown by using a thick line. It should be understood that the optical signal a and the optical signal b are merely examples, and shall not constitute any limitation on a quantity, propagation paths, and strength of optical signals. In addition, for ease of understanding, FIG. 8 shows, by using dashed lines, a field of view of the lens in the lens module 505 and a region that an optical signal incident into the screen assembly 20 along a direction of the field of view can arrive at.

In addition, for ease of comparison, the same LED 501, the same light shielding member 504, the same lens module 505, and the same screen assembly 20 are used in (a), (b), and (c) in the figure. Relative positions of other components remain unchanged except that the lens module 505 moves. For ease of comparison, the light emitting center of the LED 501 in the figure is used as a reference, and the reference is shown by using dashed lines.

(a) in FIG. 8 shows a case in which the center distance L' between the light emitting center of the LED 501 and the imaging center of the lens module 505 is equal to the critical value $L_0'$. As shown in the figure, when an optical signal close to one side of the lens module 505 is blocked by using the light shielding member 504, an optical signal c shown in the figure is an optical signal with the maximum emergent angle that can be emitted from the light shielding member 504, and an emergent angle of the optical signal is θ. When the center distance L' is the critical value $L_0'$, the optical signal c enters the lens module 505 exactly along the maximum incident angle α at the lens module 505 after being reflected by the screen assembly 20.

If the center distance between the lens module 505 and the LED 501 is less than the critical value L0', an amount of stray light received by the lens module 505 increases. When the center distance L' between the lens module 505 and the LED 501 is less than the critical value L0', for example, the lens module 505 moves towards a direction close to the LED 501, as shown by dashed lines in (b) in FIG. 8, because a lens surface of the lens module 505 moves leftwards, a corresponding image capturing region also moves leftwards. Reflected light that originally does not enter the image capturing region enters the image capturing region, so that reflected light that is not originally incident on the lens surface enters the lens surface. In addition to the optical signal c shown in the figure, more optical signals whose emergent angles are less than $\theta$ may arrive at the lens module 505 after being reflected by the screen assembly 20. In other words, a part of optical signals (namely, the above stray light) reflected after being emitted by the LED 501 to the screen assembly 20 are allowed to enter the lens module 505. When the center distance between the lens module 505 and the LED 501 is greater than or equal to the critical value $L_0'$, these optical signals are located outside the imaging lens and are not received by the lens module 505. However, when the center distance between the lens module 505 and the LED 501 decreases, these optical signals enter a range of the imaging lens and are received by the lens module 505. Therefore, when the center distance L' between the lens module 505 and the LED 501 is less than the critical value $L_0'$, the amount of stray light received by the lens module 505 increases.

If the distance between the lens module 505 and the LED 501 is greater than the critical value $L_0'$, the amount of stray light received by the lens module 505 may be reduced. When the center distance L' between the lens module 505 and the LED 501 is greater than the critical value L0', for example, the lens module 505 moves in a direction away from the LED 501, as shown by dashed lines in (c) in FIG. 8, because the lens surface of the lens module 505 moves rightwards, the corresponding image capturing region also moves rightwards. In this case, an optical signal whose emergent angle is $\theta$ (for example, the optical signal c in the figure) cannot enter the image capturing region, and therefore a probability that the optical signal is received by the lens module 505 is low. Therefore, when the center distance L' between the lens module 505 and the LED 501 is greater than the critical value $L_0'$, the amount of stray light received by the lens module 505 may be reduced. However, in addition to the optical signal c shown in the figure, more optical signals whose emergent angles are less than $\theta$ may fail to enter the image capturing region after being returned by the finger, and therefore a probability that the optical signals are received by the projection module 505 is low. Therefore, fingerprint optical signals received by the lens module 505 are also reduced, and light intensity is weakened. Therefore, when the distance between the lens module 505 and the LED 501 is excessively long, fingerprint optical signals collected by the sensor are reduced, and definition of a fingerprint image may be affected.

In view of the above, the center distance L' between the lens module 505 and the LED 501 may be designed to be greater than or equal to the critical value $L_0'$.

The following provides a specific embodiment.
h=1 mm, 2$\theta$=30°, $\theta$=9.93°, CA=2.45 mm, t'=0.8 mm, d=1.956 mm, 2$\alpha$=123°, $\alpha$'=35.86°, and $\Delta$=1 mm.

The parameters may be substituted into the above formula to obtain:

$$L' \geq 1 \times \tan 15° + 1.956 \times \tan 9.93° + 1.956 \times \tan 35.86° + 0.8 \times \tan 61.5° + 2.45/2 + 1.$$

It may be learned through calculation that L'≥5.72 mm. That is, the critical value $L_0'$ of the center distance L' between the lens module 505 and the LED 501 is 5.72 mm. In other words, a minimum center distance L' between the lens module 505 and the LED 501 may be 5.72 mm.

It should be understood that a value of each parameter listed above is merely an example for ease of understanding, and shall not constitute any limitation on this application. A specific value of each parameter is not limited in this application.

Based on the foregoing design, the light shielding member 504 absorbs a part of large-angle emergent light, so that stray light reflected by the screen assembly 20 to the lens module 505 can be reduced. Therefore, interference to the fingerprint information can be reduced, so that a fingerprint image with relatively high definition can be obtained. In particular, stray light with relatively strong light intensity can be reduced, light leakage can be avoided, and an exposure area can be reduced, so that a fingerprint image with a relatively large effective area can be obtained. Therefore, on the whole, it is advantageous to obtain a complete and clear fingerprint image, thereby improving fingerprint recognition efficiency.

It should be noted that the determining of the center distance L' shown above is designed when it is assumed that the fingerprint recognition module includes at least one lens. As described above, the fingerprint recognition module does not necessarily include the at least one lens. In this case, the center distance L may be defined as a distance between an imaging center of the LED and the center of the AA of the sensor. In addition, the center distance L meets L≥h×tan $\theta$+d×tan $\theta$'+d×tan $\beta$'+t×tan $\beta$, where t represents a distance between a photosensitive surface of the sensor and the lower surface of the screen assembly 20, $\beta$ is an FOV of the sensor, and $\beta$' represents an incident angle of an optical signal on the lower surface of the screen assembly when an incident angle at which the optical signal arrives at the sensor is $\beta$, where the optical signal is emitted by the lower surface of the screen assembly.

If a system tolerance is considered, the distance L between the light emitting center of the LED and the center of the AA of the sensor meets L≥h×tan $\theta$+d×tan $\theta$'+d×tan $\beta$'+t×tan $\beta$+$\Delta$, where $\Delta$ represents the system tolerance.

Certainly, the at least one lens may be replaced with another component or a combination of components. In this case, the foregoing definition of the center distance may change accordingly, and values and definitions of $\alpha$, $\alpha$', t, and CA in the formula of calculating the center distance L' may also change accordingly.

Figure 9:
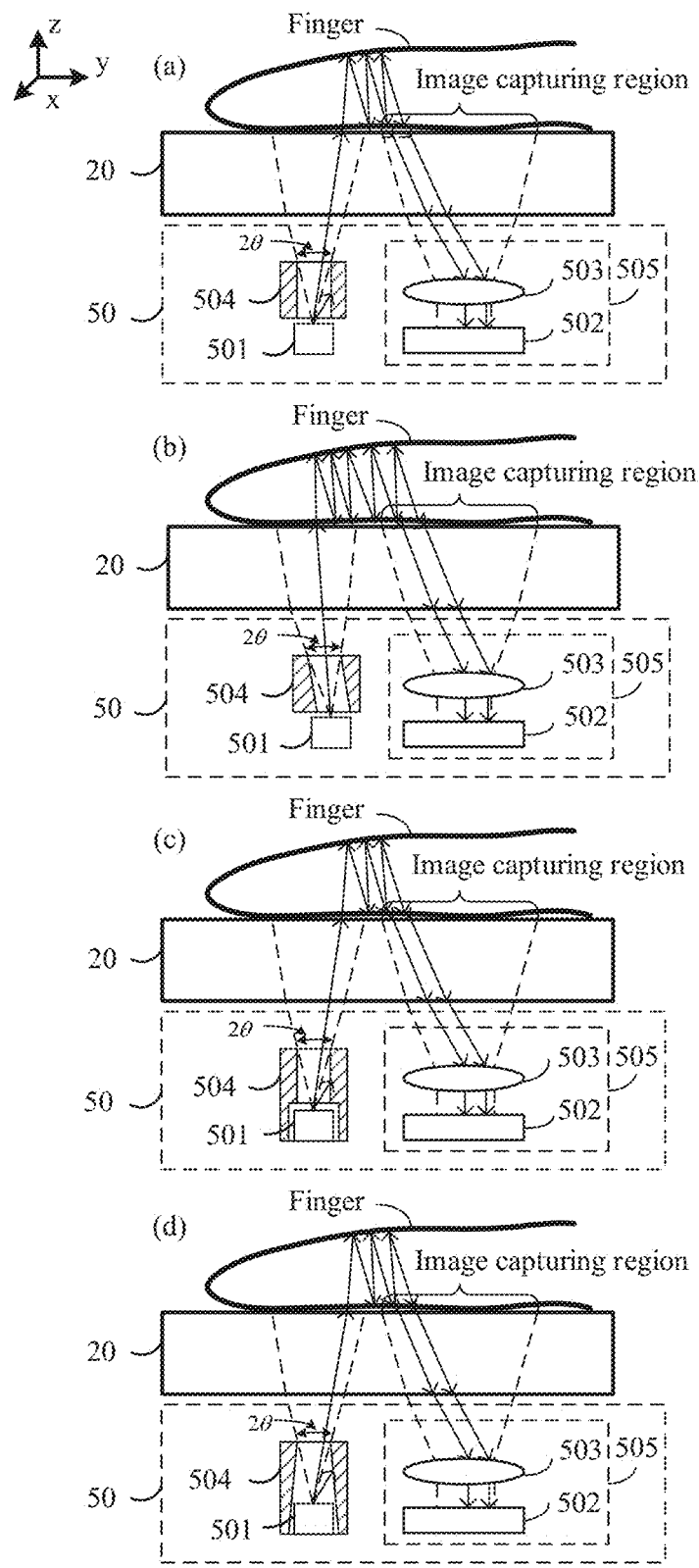
FIG. 9 is another schematic diagram of a fingerprint recognition module according to an embodiment of this application.

As described above, the light shielding member 504 may be alternatively designed to block large-angle emergent light of the LED 501 in all directions. FIG. 9 is another schematic diagram of a fingerprint recognition module according to an embodiment of this application. The light shielding member 504 shown in FIG. 9 may block large-angle emergent light of the LED 501 in all directions. For ease of understanding, FIG. 9 shows, by using dashed lines, a field of view of a lens in the lens module 505 and a region that an optical signal incident into the screen assembly 20 along a direction of the field of view can arrive at, and a maximum emergent angle that can be reached by an optical signal emitted by the LED

501 and a region that an optical signal incident into the screen assembly 20 along a direction of the maximum emergent angle can arrive at.

Specifically, the light shielding member 504 may be a mechanical part with a light-through hole (or referred to as an out-light hole). A hole wall of the light-through hole surrounds optical signals emitted by the LED 501, to block a part of emergent light emitted by the LED 501. For example, the light shielding member 504 may be cylindrical, and an inner surface of the light shielding member 504 may form a cylinder, an oblique cylinder, an elliptical cylinder, an inverted funnel, a cuboid, a cube, a hexagon, a trapezoid, a stepped cylinder, a stepped oblique cylinder, a stepped elliptical cylinder, a stepped inverted funnel, a stepped cuboid, a stepped cube, a stepped hexagon, or a stepped trapezoid. For brevity, examples are not enumerated herein one by one. It may be understood that the hole wall of the light-through hole of the light shielding member 504 herein may be used to block large-angle emergent light of the LED 501 in all directions, and has a same function as the above first surface. In other words, the hole wall may be understood as the above first surface.

Optionally, an orifice of the light-through hole of the light shielding member 504 is a circle, an ellipse, a square, or a rectangle. A shape of the orifice of the light-through hole may be a shape obtained by using an intersecting line between an upper surface of the light shielding member 504 and an inner wall of the hole; or the light-through hole may be a shape of a projection obtained by projecting an inner surface of the light shielding member 504 onto a lower surface of the screen assembly 20.

Optionally, a shape of a cross section of the light shielding member 504 in a direction perpendicular to the screen assembly 20 (namely, on a yoz plane) is a square, a rectangle, a trapezoid, a stepped square, a stepped rectangle, or a stepped trapezoid.

The shape of the orifice of the out-light hole of the light shielding member 504 and the shape of the cross section in the direction perpendicular to the screen assembly 20 may be combined. Therefore, the inner wall of the light-through hole of the light shielding member 504 may form various different shapes.

Figure 18:
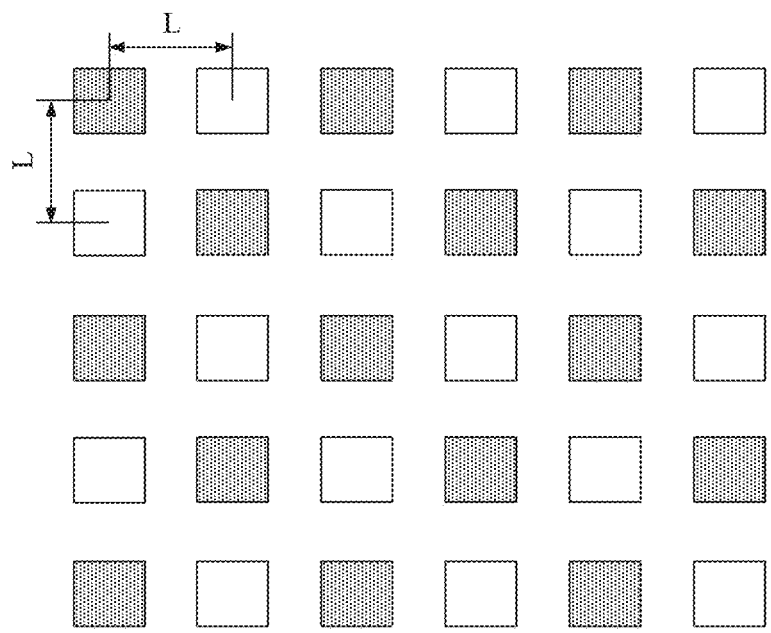
FIG. 18 is a schematic diagram of arrangement of a plurality of LEDs, a plurality of light shielding members, and a plurality of lens modules in a fingerprint recognition module according to an embodiment of this application.

It should be noted that, when the orifice of the light-through hole of the light shielding member 504 is a circle, and the cross section in the direction perpendicular to the screen assembly 20 is symmetrical about a light emitting center of the LED 501, maximum emergent angles of optical signals emitted by the LED 501 may be controlled to be the same in all directions, for example, θ. This design is particularly applicable to a case in which an array includes a plurality of lens modules, a plurality of LEDs, and a plurality of light shielding members, as shown in FIG. 18. This design may also be applied to a case in which a plurality of LEDs and a plurality of light shielding members are uniformly distributed in a lens module, as shown in (c) in FIG. 12.

When the out-light hole of the light shielding member 504 is an ellipse, a square, or a rectangle, maximum emergent angles of optical signals emitted by the LED 501 are slightly different in all directions. For example, for an ellipse, a maximum emergent angle in a direction of a long axis direction is greater than a maximum emergent angle in a direction of a short axis. For a square or a rectangle, a maximum emergent angle in a diagonal face is greater than a maximum emergent angle between any two opposite faces. This design is particularly applicable to a case in which two or more LEDs are distributed around one lens module, as shown in (a), (b), and (d) in FIG. 12. Because different maximum emergent angles are used in different directions, more optical signals can be incident into the screen assembly 20, so that light intensity can be improved, and more fingerprint information can be obtained, thereby obtaining a clearer and more accurate fingerprint image.

Therefore, a shape of the light-through hole of the light shielding member 504 may be properly designed based on different maximum emergent angles and a relative position relationship between the LED 501 and the lens module 505.

When a shape of a cross section of the inner surface of the light shielding member 504 in the direction perpendicular to the screen assembly 20 is stepped, more optical signals can be incident into the screen assembly 20. Based on the same reason described above, more fingerprint optical signals can be obtained, and a clearer and more accurate fingerprint image can be obtained (a) to (d) in FIG. 9 show several different shapes of a cross section of the hole wall of the light-through hole of the light shielding member 504 in the direction perpendicular to the screen assembly 20. FIG. 9 specifically shows several different shapes of the cross section of the hole wall of the light-through hole of the light shielding member 504 on the yoz plane.

As shown in (a) in FIG. 9, the cross section of the hole wall of the light-through hole of the light shielding member 504 in the direction perpendicular to the screen assembly 20 (for example, the yoz plane) is a rectangle, and a cross section of the hole wall of the light-through hole of the light shielding member 504 in a direction parallel to the screen assembly 20 (for example, an xoy plane) may be a circle, an ellipse, a square, a rectangle, or the like. Therefore, the hole wall of the light-through hole of the light shielding member 504 shown in (a) in FIG. 9 may form a cylinder, an elliptical cylinder, a cube, a cuboid, or the like.

As shown in (b) in FIG. 9, the cross section of the hole wall of the light-through hole of the light shielding member 504 in the direction perpendicular to the screen assembly 20 (for example, the yoz plane) is a parallelogram, and the cross section of the hole wall of the light-through hole of the light shielding member 504 in the direction parallel to the screen assembly 20 (for example, the xoy plane) may be a circle, an ellipse, a square, a rectangle, or the like. Therefore, the hole wall of the light-through hole of the light shielding member 504 shown in (b) in FIG. 9 may form an oblique cylinder, an oblique elliptical cylinder, a cube, a hexagon, or the like.

As shown in (c) in FIG. 9, the cross section of the hole wall of the light-through hole of the light shielding member 504 in the direction perpendicular to the screen assembly 20 (for example, the yoz plane) is stepped, and the cross section of the hole wall of the light-through hole of the light shielding member 504 in the direction parallel to the screen assembly 20 (for example, the xoy plane) may be a circle, an ellipse, a square, a rectangle, or the like. Therefore, the hole wall of the light-through hole of the light shielding member 504 shown in (c) in FIG. 9 may form a stepped cylinder, a stepped elliptical cylinder, a stepped cube, a stepped cuboid, or the like.

As shown in (d) in FIG. 9, the cross section of the hole wall of the light-through hole of the light shielding member 504 in the direction perpendicular to the screen assembly 20 (for example, the yoz plane) is stepped, and the cross section of the hole wall of the light-through hole of the light shielding member 504 in the direction parallel to the screen assembly 20 (for example, the xoy plane) may be a circle, a square, or the like. Therefore, the hole wall of the light-through hole of the light shielding member 504 shown in (d) in FIG. 9 may form a trapezoid, an inverted funnel, or the like.

It should be understood that with reference to FIG. 9, several different shapes that may be formed by the hole wall of the light-through hole of the light shielding member 504 are listed above. However, this shall not constitute any limitation on this application.

For a relative position relationship among the LED 501, the lens module 505, and the light shielding member 504 in FIG. 9, refer to the foregoing descriptions with reference to FIG. 6 and FIG. 8. For brevity, details are not described herein again.

In addition, an outer surface of the light shielding member 504 may form a cylinder, a stepped cylinder, a cuboid, a cube, or the like. This is not limited in this application. In addition, a shape formed by the hole wall of the light-through hole of the light shielding member 504 is irrelevant to a shape formed by the outer surface. For example, the hole wall of the light-through hole of the light shielding member 504 may form a cylinder, and the outer surface of the light shielding member 504 may form a cylinder. In this case, the light shielding member 504 may be a hollow cylinder. For another example, the hole wall of the light-through hole of the light shielding member 504 may form a cylinder. For another example, the hole wall of the light-through hole of the light shielding member 504 forms an oblique cylinder, and the outer surface of the light shielding member 504 may form a cylinder. For brevity, examples are not enumerated herein one by one.

Figure 10:
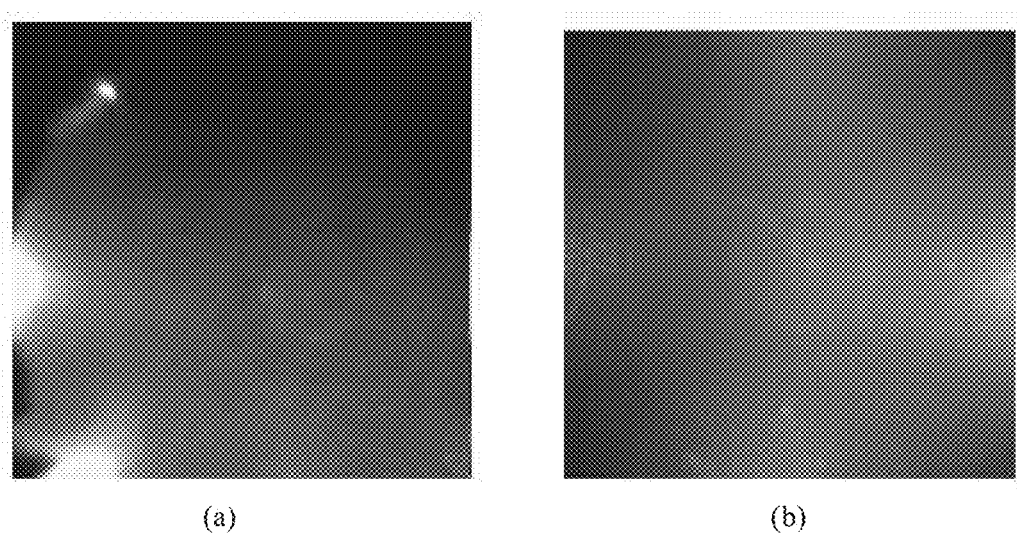
FIG. 10 is an effect comparison diagram obtained when a light shielding member is used in a fingerprint recognition module and no light shielding member is used in the fingerprint recognition module according to an embodiment of this application.

FIG. 10 is an effect comparison diagram obtained when the light shielding member is used in the fingerprint recognition module and no light shielding member is used in the fingerprint recognition module according to an embodiment of this application. Similar to FIG. 4 above, FIG. 10 is a schematic diagram obtained after a test target above the screen assembly 20 receives an optical signal from the LED 501. (a) in FIG. 10 is a schematic diagram obtained when no light shielding member is used in the fingerprint recognition module a, and (b) in FIG. 10 is a schematic diagram obtained after the light shielding member shown in FIG. 9 is used in the fingerprint recognition module. It may be learned through comparison that when no light shielding member is used in the fingerprint recognition module, light intensity distribution is not uniform, and a light leakage phenomenon occurs in many places. However, if the light shielding member is used in the fingerprint recognition module, light intensity distribution is relatively uniform, and a light leakage phenomenon is basically eliminated.

In addition, to cooperate with normal use of the fingerprint recognition module 50, some improvements may need to be made to the screen assembly 20.

For example, because the fingerprint recognition module 50 is located below the screen assembly 20, and an optical signal emitted by the LED 401 needs to penetrate the screen assembly 20 to be incident into a finger, a substrate 211 of the screen assembly 20 may block propagation of the optical signal in a direction above the screen assembly 20. If it is expected that the optical signal penetrates the screen assembly 20 to enter the finger, opening processing needs to be performed on the substrate 211 at a position corresponding to the LED 501, so that the optical signal can be propagated in the direction above the screen assembly 20. Specifically, opening processing may be performed at a position that is on the substrate 211 and that is corresponding to the light shielding member 504. A size of an opening may be determined based on a maximum emergent angle of the LED 501 and a distance between an upper surface of the LED 501 and an upper surface of the substrate 211.

Taking (a) in FIG. 9 as an example, if a maximum emergent angle of an optical signal emitted by the LED 501 is θ, and the distance between the upper surface of the LED 501 and the upper surface of the substrate 211 is s1, the opening may be, for example, a circle whose center is a light emitting center of the LED 501 and whose radius is s1×tan θ, or a square whose center is a light emitting center of the LED 501 and whose side length is 2×s1×tan θ. A shape of the opening may be the same as a shape of a light-through hole of the light shielding member 504. For brevity, examples are not enumerated herein one by one.

Similarly, strength of a fingerprint optical signal that arrives at the screen assembly 20 after being propagated through the finger is greatly reduced, and the fingerprint optical signal cannot penetrate the substrate 211 of the screen assembly 20. If it is expected that the fingerprint optical signal arrives at the lens module 505, opening processing needs to be performed on the substrate 211, so that the fingerprint optical signal enters the fingerprint recognition module 50, to obtain fingerprint information. Specifically, opening processing may be performed on the substrate 211 at a position corresponding to an image capturing region, so that a fingerprint optical signal falling into the image capturing region can penetrate the screen assembly 20 to arrive at the lens module 505. A size of the opening may be determined, for example, based on a distance between an upper surface of the lens module 505 and the upper surface of the substrate 211 and an FOV of an imaging lens in the lens module 505. If the FOV of the imaging lens in the lens module 505 is 2α, and the distance between the upper surface of the lens module 505 and the upper surface of the substrate 211 is s2, the opening may be, for example, a circle whose center is an imaging center of the lens module 505 and whose radius is CA/2+s1/tan α. Definitions of CA and α are described in detail above with reference to FIG. 7. For brevity, details are not described herein again.

The opening processing may also be referred to as windowing, puncturing, hole punching, or the like. That is, a part of material that blocks an optical signal on the substrate 211 is removed, to ensure that the optical signal is emitted outwards through the screen assembly 20, or ensure that the optical signal arrives at the lens module through the screen assembly 20. Because an optical signal may pass through the screen assembly 20 to arrive at the finger through opening processing, an opening obtained through the opening processing may also be referred to as a light-through hole.

It should be noted that the position that is on the substrate 211 and that is corresponding to the light shielding member 504 herein is specifically a position that is on the substrate 211 and that is corresponding to the light shielding member 504 when the fingerprint recognition module 50 and the screen assembly 20 are separately assembled in the electronic device. A position that is on the substrate 211 and that is corresponding to the sensor 502 herein is specifically a position that is on the substrate 211 and that is corresponding to the sensor 502 when the fingerprint recognition module 50 and the screen assembly 20 are separately assembled in the electronic device. For brevity, descriptions of a same or similar case are omitted below.

For ease of understanding of this embodiment of this application, a case in which the fingerprint recognition module includes one LED, one lens module, and one light shielding member is show above with reference to FIG. 5 to FIG. 9. However, this shall not constitute any limitation on this application. A quantity of LEDs, a quantity of sensors, a quantity of lens modules, and a quantity of light shielding members are not limited in this application. However, it may be understood that the light shielding member may be used in cooperation with the LED. Therefore, the quantity of light shielding members may correspond to the quantity of LEDs. The lens module and the sensor are used in cooperation. Therefore, the quantity of lens modules corresponds to the quantity of sensors.

Figure 11:
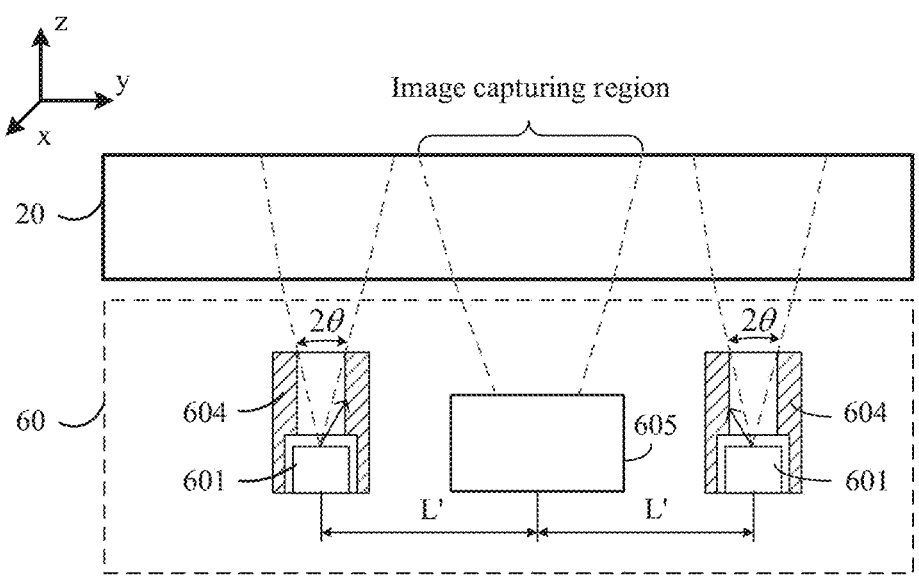
FIG. 11 is still another schematic diagram of a fingerprint recognition module according to an embodiment of this application.

FIG. 11 is still another schematic diagram of a fingerprint recognition module according to an embodiment of this application. FIG. 11 specifically shows a fingerprint recognition module 60. The fingerprint recognition module 60 includes a plurality of LEDs 601, one lens module 605, and a plurality of light shielding members 604. For brevity, the lens module 605 is shown as a whole in FIG. 11, and at least one lens and a sensor are not separately shown. However, this shall not constitute any limitation on this application. For ease of understanding, FIG. 11 shows, by using dashed lines, a field of view of a lens in the lens module 605 and a region that an optical signal incident into a screen assembly 20 along a direction of the field of view can arrive at, and a maximum emergent angle that can be reached by an optical signal emitted by the LED 601 and a region that an optical signal incident into the screen assembly 20 along a direction of the maximum emergent angle can arrive at.

The LED 601 may correspond to the LED 501 shown in FIG. 5 to FIG. 9. The lens module 605 may correspond to the lens module 505 shown in FIG. 5 to FIG. 9. For related descriptions of the LED 601 and the lens module 605, refer to the above related descriptions with reference to FIG. 5 to FIG. 9. The light shielding member 604 may correspond to the light shielding member 504 shown in FIG. 9. For related descriptions of the light shielding member 604, refer to the above related descriptions with reference to FIG. 9. For brevity, details are not described herein again.

As shown in FIG. 11, the fingerprint recognition module 60 includes two LEDs 601, two light shielding members 604, and one lens module 605. Each light shielding member 604 and one LED 601 are used in cooperation, and may constitute one light source assembly. The light source assembly may be disposed near the lens module 605, to provide an optical signal for obtaining fingerprint information. For example, a relative position relationship between the light source assembly and the lens module may be described above: A distance L' between a center of the LED 601 and a center of an imaging lens of the lens module 605 is greater than or equal to the above critical value $L_0'$.

Because the two LEDs 601 and the two light shielding members 604 may constitute two light source assemblies, the two light source assemblies may be symmetrically distributed on two sides of the lens module 605, as shown in FIG. 11, or may be distributed on one side of the lens module 605, and a distance between each light source assembly and the lens module 605 may meet the following condition: a center distance L' between the LED 601 and the lens module 605 is greater than or equal to the critical value $L_0'$. As described above, the center distance between the LED 601 and the lens module 605 is L'. In this case, light emitting centers of the LEDs 601 in the two light source assemblies may be distributed at any position on a circumference whose center is a center of an imaging lens of the sensor 602 and whose radius is L'.

It should be understood that for ease of understanding only, FIG. 11 shows a case in which the two light source assemblies are symmetrically placed on two sides of the lens module. Actually, a quantity of light source assemblies is not limited in this application. For example, there may be four, eight, or twelve light source assemblies. A plurality of light source assemblies may be uniformly or non-uniformly distributed on a circumference whose center is a center of the imaging lens of the lens module and whose radius is L.

Figure 12:
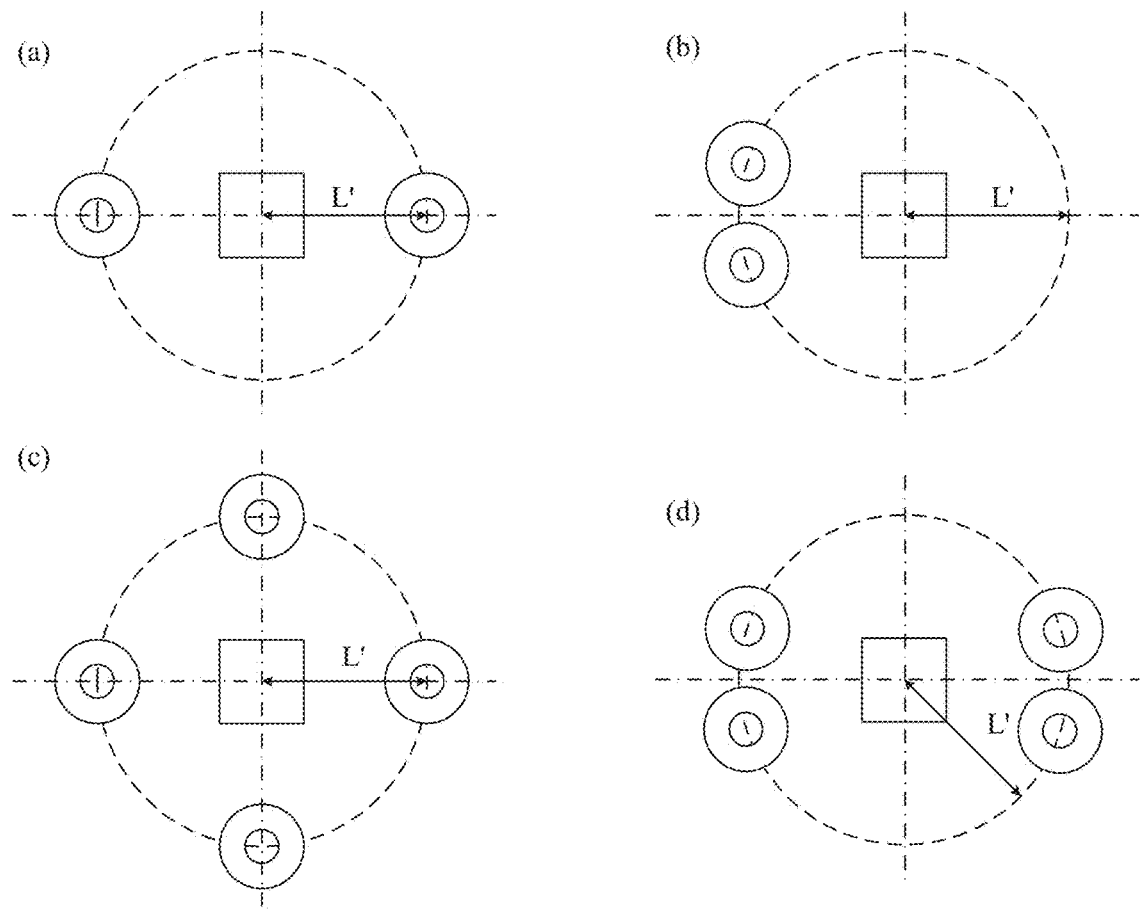
FIG. 12 is a schematic diagram of a relative position relationship between a plurality of light source assemblies and a lens module in a fingerprint recognition module according to an embodiment of this application.

FIG. 12 shows several examples of a relative position relationship between a plurality of light source assemblies and a lens module. FIG. 12 shows the relative position relationship between the plurality of light source assemblies and the lens module from a perspective of a top view. FIG. 12 schematically shows a plurality of light source assemblies and one sensor. The light source assembly shown in FIG. 12 may be, for example, the light source assembly described above with reference to FIG. 11. Each light source assembly includes one light shielding member 604 and one LED 601. A circle in the figure indicates the light source assembly. The light shielding member is a hollow cylinder, and shields the LED below the light shielding member. Therefore, the LED is not separately shown in the figure. A square in the figure indicates the lens module. For example, the lens module may be the lens module 605 described above with reference to FIG. 11. It should be understood that the shapes shown in the figure shall not constitute any limitation on shapes of the light shielding member, the lens module, and the like. Specifically, (a) in FIG. 12 shows an example in which two light source assemblies are distributed on two sides of the lens module. (b) in FIG. 12 shows an example in which two light source assemblies are distributed on one side of the lens module. (c) in FIG. 12 shows an example in which four light source assemblies are uniformly distributed around the lens module. (d) in FIG. 12 shows an example in which four light source assemblies are distributed on two sides of the lens module in two groups, where one group includes two assemblies. For brevity, examples are not enumerated herein one by one by using the accompanying drawings.

It should be further understood that a quantity of lens modules is not limited in this application either. A case in which the fingerprint recognition module includes a plurality of lens modules and a plurality of light source assemblies is described in detail below with reference to FIG. 18. Detailed descriptions of this embodiment are omitted herein.

Certainly, center distances between a plurality of light source assemblies and a lens module may also be different, but shall meet the above condition that the center distance is greater than or equal to the critical value $L_0'$.

FIG. 13 to FIG. 16 are schematic assembly diagrams of a fingerprint recognition module according to an embodiment of this application. Taking the fingerprint recognition module 60 shown in FIG. 11 as an example, FIG. 13 to FIG. 16 show several possible implementations of assembling the fingerprint recognition module in an electronic device. However, this shall not constitute any limitation on this application. Based on a same or similar method, the fingerprint recognition module 50 shown in FIG. 5 to FIG. 9 may be assembled in the electronic device.

In an embodiment, the lens module in the fingerprint recognition module may be independently fastened to a middle frame or a lower surface of the screen assembly. The LED and the light shielding member (namely, the above light source assembly) in the fingerprint recognition module may also be independently fastened to the middle frame or the lower surface of the screen assembly.

Figure 13:
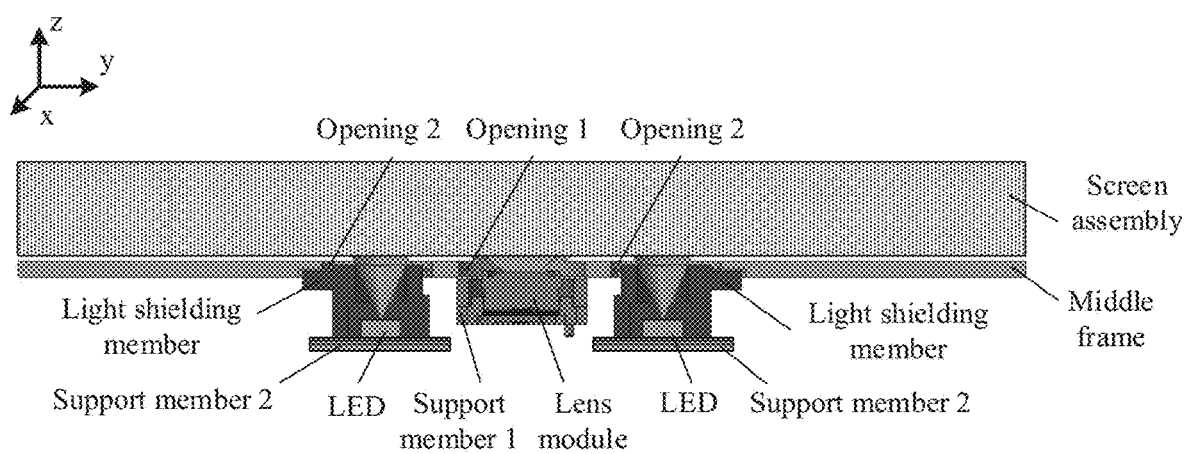
FIG. 13 is a schematic assembly diagram of a fingerprint recognition module according to an embodiment of this application.

FIG. 13 shows an example in which the lens module in the fingerprint recognition module is independently fastened to the middle frame, and the LED and the light shielding member are also independently fastened to the middle frame.

Specifically, the lens module may be mounted on a support member 1 by using, for example, a surface mounting technology (surface mounting technology, SMT). The support member 1 may be fastened to the middle frame by using an adhesive or a screw. To ensure that the lens module receives a fingerprint optical signal, opening processing needs to be performed on the middle frame. An opening position of the middle frame may correspond to a position of the lens module, that is, correspond to an opening position of the above substrate of the screen assembly, or correspond to an image capturing region. For ease of differentiation and description, an opening corresponding to the lens module is denoted as an opening 1. In addition, a quantity of openings 1 may be the same as a quantity of lens modules. Each opening 1 may correspond to one lens module. A size of the opening 1 may be related to an FOV of an imaging lens of the lens module, a diameter CA of an out-light hole, and a distance between an upper surface of the lens module and a lower surface of the middle frame. For example, if a distance between the upper surface of the lens module and an upper surface of the middle frame is m2, the opening 1 may be a circle whose center is a center of the imaging lens of the lens module and whose radius is $CA/2 + m2 \times \tan \alpha$.

The opening 1 shown in FIG. 13 may be a circular hole. The support member 1 may be, for example, laminated to an end face of the hole by using an adhesive. That is, an upper surface of the support member 1 is laminated to a region near the opening 1 on the lower surface of the middle frame. It should be understood that a shape of the opening 1 listed herein is merely an example. Alternatively, the opening 1 may be, for example, a stepped hole, a square hole, or even a through hole of an irregular shape. A specific shape of the opening 1 is not limited in this application. It should be further understood that the foregoing listed manner of fastening the support member 1 and the fastening position are merely examples, and shall not constitute any limitation on this application.

The LED and the light shielding member (namely, the above light source assembly) in the fingerprint recognition module may also be mounted on a support member 2 by using, for example, an SMT. The support member 2 may be, for example, a combination of a flexible plate and a reinforcement plate. The support member 2 may be configured to carry the light source assembly. The support member 2 may be fastened to the middle frame or the screen assembly by using an adhesive or a screw. Although not shown in the figure, the support member 2 may be, for example, fastened to the middle frame or the screen assembly by using an adhesive or a screw in a direction perpendicular to the screen assembly (for example, a z direction). A shape of the light shielding member may be, for example, shown in FIG. 9 or FIG. 11, or may be another shape. This is not limited in this application.

It should be noted that an inverted cone shown above the LED in FIG. 13 is an illustration of a maximum emergent angle formed by the LED in the light shielding member. An inverted truncated cone shown above the lens module in FIG. 13 is an illustration of the FOV of the imaging lens of the lens module. It should be understood that the cone and the truncated cone are respectively schematic diagrams of the maximum emergent angle of the LED and the FOV of the imaging lens of the lens module, and shall not constitute any limitation on this application, and shall not constitute any limitation on a shape of an optical signal within the foregoing angle range. In addition, although not shown in FIG. 15 and FIG. 16 below, the illustrations and the descriptions of the maximum emergent angle and the FOV in FIG. 13 are still applicable.

Figure 14:
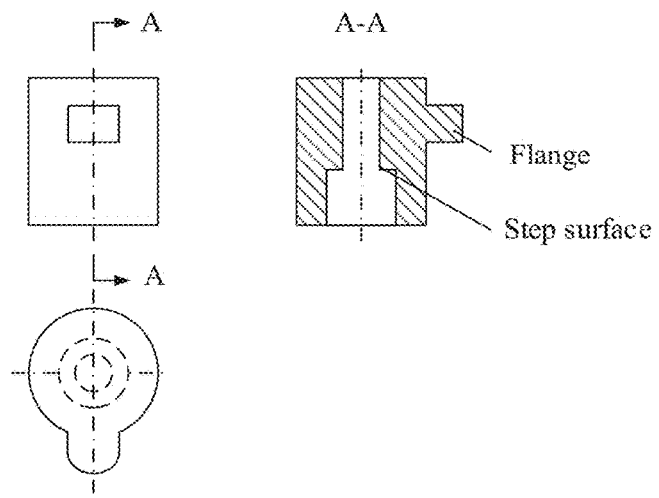
FIG. 14 is another schematic diagram of a light shielding member according to an embodiment of this application.

FIG. 14 is still another schematic diagram of a light shielding member according to an embodiment of this application. As shown in FIG. 14, an outer surface of the light shielding member has a flange extending outwards. The flange may extend outwards in partial regions of the outer surface of the light shielding member, as shown in FIG. 14, or may surround an entire circumference of an outer edge of the light shielding member. This is not limited in this application. The flange may be configured to fasten the light source assembly. For example, an upper surface of the flange may be coated with an adhesive, to laminate the light shielding member to the middle frame or a lower surface of the screen assembly. For another example, the flange and the middle frame may be connected by using a screw.

To avoid the LED and the light shielding member, opening processing needs to be performed on the middle frame. An opening position of the middle frame may correspond to a position of the light shielding member. A size of an opening may be slightly greater than that of the outer surface of the light shielding member. For ease of differentiation and description, an opening corresponding to the light shielding member is denoted as an opening 2. In addition, a quantity of openings 2 may be the same as a quantity of light shielding members. Each opening 2 may correspond to one light shielding member.

The opening 2 shown in FIG. 14 is a stepped through hole. When a flange extends on an outer surface of the light shielding member 604, an upper surface of the flange may be opposite to a step surface of the opening 2, and the light source assembly is fastened through adhesive lamination, screw connection, or the like.

It should be understood that a shape of the opening 2 listed herein is merely an example, and the opening 2 may be, for example, a circular hole or a square hole. However, this is merely an example for ease of understanding, and shall not constitute any limitation on this application. It should be further understood that shapes of the light shielding members shown in FIG. 13 and FIG. 14, and a manner and a position of connection between the light shielding member and the middle frame are merely examples, and shall not constitute any limitation on this application. Although not shown in the figure, a manner of connection between the light shielding member and the middle frame or the screen assembly is not limited to the foregoing descriptions. For example, no flange may be disposed on the outer surface of the light shielding member. The light shielding member may be, for example, a hollow cylinder, and the opening 2 may be, for example, a circular through hole. The light shielding member may be inserted into the circular through hole of the opening 2, and an inner surface of the opening 2 is laminated and fastened to the outer surface of the light shielding member by using an adhesive.

Regardless of whether the opening 2 is a circular through hole or a stepped hole, a size of the opening 2 on an upper surface of the middle frame may be determined based on a maximum emergent angle of an optical signal emitted by the LED and a distance between an upper surface of the LED and the upper surface of the middle frame. In addition, the opening 2 is similar to an opening of the above substrate 211. A shape of the opening 2 may be the same as a shape of an out-light hole of the light shielding member 504. If the distance between the upper surface of the θ, or the opening 2 may be, for example, a circle whose center is a light emitting center of the LED and whose side length is 2×m1/tan θ. For brevity, examples are not enumerated herein one by one. A definition of θ is described in detail above. For brevity, details are not described herein again.

It should be further understood that the "fastening" herein may be implemented, for example, in an existing manner such as adhesive lamination or screw fastening. For brevity, a specific fastening manner is not described in detail in this specification.

In another embodiment, the light shielding member is integrated into the middle frame of the electronic device. The middle frame is located between the screen assembly and the fingerprint recognition module, and the middle frame has a light-through hole in a region corresponding to the LED. A hole wall of the light-through hole surrounds optical signals emitted by the LED, to block a part of the optical signals emitted by the LED.

Specifically, the light shielding member in the fingerprint recognition module may be integrated into the middle frame, or the light shielding member in the fingerprint recognition module and the middle frame has an all-in-one design. An optical signal can be blocked by the light shielding member in a manner of performing opening and blackening processing on the middle frame. In addition, the lens module in the fingerprint recognition module may be independently fastened to the middle frame or the screen assembly, and the LED may be independently fastened to the middle frame.

Figure 15:
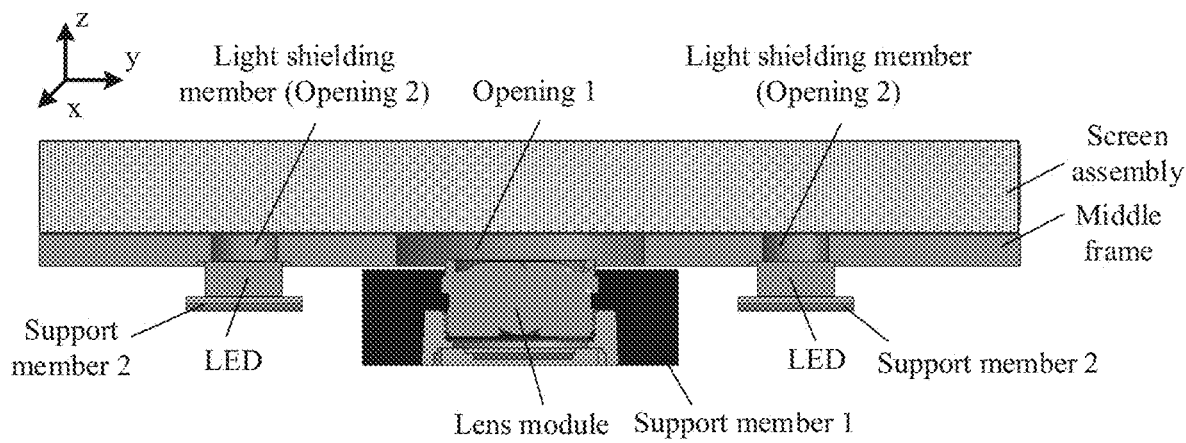
FIG. 15 is another schematic assembly diagram of a fingerprint recognition module according to an embodiment of this application.

FIG. 15 shows an example in which the light shielding member is integrated into the middle frame. As shown in FIG. 15, a specific method for connecting the lens module to the middle frame by using the support member 1 may be the same as the above method shown with reference to FIG. 13. To cooperate with the fingerprint recognition module, opening processing may be performed on a region that is on the middle frame and that is corresponding to the sensor. For details of an opening region and size, refer to the above related descriptions of the opening 1. For brevity, details are not described herein again.

In FIG. 15, opening processing also needs to be performed on a region corresponding to the LED. As described above, a region corresponding to the light shielding member may be denoted as an opening 2. In this embodiment, the opening 2 is a light-through hole that is on the middle frame and that is used to block a part of optical signals emitted by the LED. Therefore, an inner surface of the opening 2 is a hole wall of a light-through hole of the light shielding member. Blackening processing is performed on the inner surface, an upper end surface, and a lower end surface of the opening 2, so that the opening 2 can absorb an optical signal that is incident into a surface of the opening 2, thereby blocking an optical signal by using the light shielding member. The inner surface of the opening 2 may form a circle, a square, a rectangle, or the like. This is not limited in this application. For example, for a shape formed by the inner surface of the opening 2, refer to the shape formed by the hole wall of the light-through hole of the light shielding member shown in FIG. 9 or FIG. 11.

The opening 2 shown in FIG. 15 is a stepped circular hole. A step surface of the stepped circular hole may be opposite to an upper surface of the LED. An inner surface (or a hole wall) of the stepped circular hole may form two cylinders of different sizes. An inner surface forming a smaller cylinder may be used to block large-angle emergent light from the LED, to block an optical signal by using the light shielding member. An inner surface forming a larger cylinder may surround a side surface of the LED. The LED may be mounted on the support member 2 by using, for example, an SMT. An upper surface of the support member 2 may be fastened to a lower surface of the middle frame through adhesive lamination or threaded connection. A size of the opening 2 may be determined based on a height of the light shielding member and a maximum emergent angle of an optical signal emitted by the LED. For the size of the opening 2, refer to the above related descriptions of w1 or w3 with reference to FIG. 6. For example, when the light-through hole of the light shielding member is a circle, the size of the opening 2 may be, for example, a circle whose radius is w1 or w3.

It should be understood that, for related descriptions of the opening 1, the support member 1, and the support member 2 of the middle frame in this embodiment, refer to the foregoing descriptions with reference to FIG. 13. For brevity, details are not described herein again.

In still another embodiment, the fingerprint recognition module is carried on a holder, and is fastened below the screen assembly by using the holder. The holder includes a primary compartment and a secondary compartment. The primary compartment is configured to accommodate the image sensor. The secondary compartment is configured to accommodate the LED, the light shielding member is integrated into the secondary compartment, and the secondary compartment is a light-through hole that penetrates a thickness direction of the holder. The light-through hole may be configured to accommodate the LED, and a hole wall of the light-through hole surrounds optical signals emitted by the LED, to block a part of the optical signals emitted by the LED.

Specifically, fingerprint recognition modules may share a same holder, and the holder may simultaneously implement functions of carrying and fastening the fingerprint recognition module and blocking an optical signal by using the light shielding member.

Figure 16:
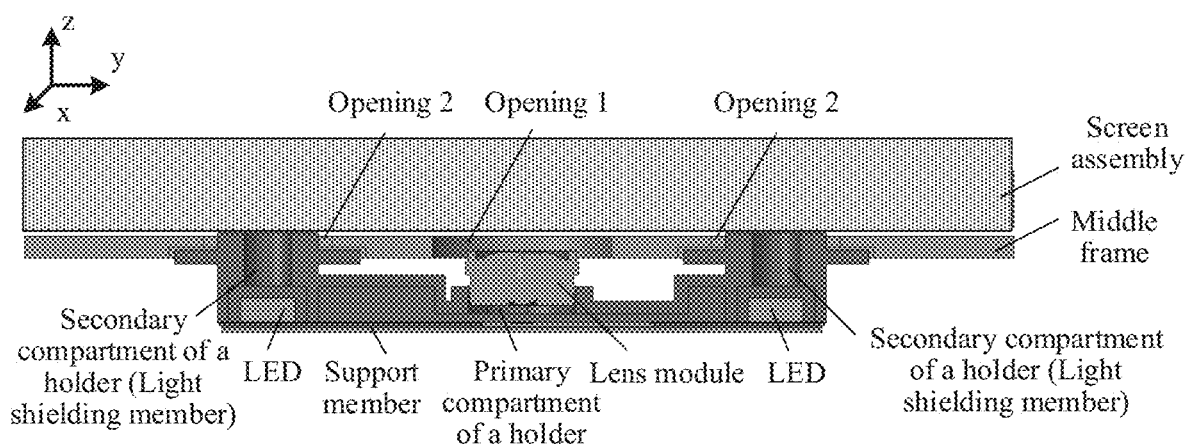
FIG. 16 is still another schematic assembly diagram of a fingerprint recognition module according to an embodiment of this application.

FIG. 16 shows an example in which the fingerprint recognition modules share the holder. As shown in FIG. 16, based on sizes of the LED, the light shielding member, and the lens module and a relative position relationship among the LED, the light shielding member, and the lens module, an all-in-one holder may be obtained through machining. The holder may be integrally formed, or may be obtained through machining. This is not limited in this application. A position that is on the holder and that is corresponding to the lens module is the primary compartment. The primary compartment may be a through hole that penetrates the thickness direction of the holder, or may be a blind hole that does not penetrate the thickness direction of the holder. The primary compartment may be configured to accommodate the lens module. A position that is on the holder and that is corresponding to the LED and the light shielding member is the secondary compartment. The secondary compartment may be a through hole that penetrates the thickness direction of the holder, and is configured to accommodate the LED. The light shielding member may be integrated into the secondary compartment, and blackening processing may be performed on an inner surface (or a hole wall), an upper end surface, and a lower end surface of the secondary compartment, to absorb an optical signal that is incident into a surface of the secondary compartment, and block, from all around, optical signals emitted by the LED, thereby implementing a function of the light shielding member. Because an optical signal may pass through the secondary compartment to arrive at a finger, the secondary compartment of the holder may be referred to as a light-through hole.

The middle frame may be designed in cooperation with the holder. For example, opening processing may be performed at a position corresponding to the primary compartment, and an opening obtained through the opening processing is the above opening 1. Opening processing may be performed at a position corresponding to the secondary compartment, and an opening obtained through the opening processing is the above opening 2. The holder shown in FIG. 16 is connected to the middle frame by using the secondary compartment. Specifically, the opening 2 of the middle frame may be a stepped hole, and a step surface of the stepped hole may be connected to an upper surface of the holder through adhesive lamination, screw connection, or the like, to fasten the holder to the lower surface of the middle frame.

In addition, the LED and the lens module may be carried on a support member, for example, the above support member 1 and support member 2, or may be an all-in-one support member shown in FIG. 16. An upper surface of the support member is opposite to a lower surface of the holder. The support member may be fastened to the lower surface of the holder through adhesive lamination, screw connection, or the like.

It should be understood that a shape of the holder shown in FIG. 16 is merely an example, and shall not constitute any limitation on this application. As long as the primary compartment that may be configured to accommodate the lens module and the secondary compartment that may be configured to accommodate the LED are disposed in the holder, the primary compartment and the secondary compartment shall fall within the protection scope of this application. In addition, the light shielding member may be integrated into the secondary compartment. The light shielding member may be independently disposed and accommodated in the secondary compartment. This is not limited in this application. It should be further understood that a fastening manner and a fastening position of the holder are not limited in this application.

Based on the fingerprint recognition module provided in the foregoing embodiment, the light shielding member is disposed at an edge of the LED to absorb large-angle emergent light, so that optical signals that arrive at the lens module after being reflected by a surface and an internal section of the screen assembly can be reduced. Therefore, interference to fingerprint information can be reduced, so that a fingerprint image with relatively high definition can be obtained. In addition, various different assembly manners are provided, to provide a plurality of possible implementations for application of the fingerprint recognition module in the electronic device.

However, it should be understood that the foregoing descriptions are merely an example, and several possible schematic assembly diagrams of applying the fingerprint recognition module provided in this embodiment of this application to the electronic device are shown. This shall not constitute any limitation on a use scenario and an assembly manner of the fingerprint recognition module. Any method for blocking large-angle emergent light by using the light shielding member to reduce interference from stray light to fingerprint information, so as to improve definition of a fingerprint image shall fall within the protection scope of this application.

On the other hand, after an optical signal that is not blocked by the light shielding member is incident into the screen assembly, the optical signal may also be reflected. In addition, some optical signals may also arrive at the sensor through a plurality of reflections. Although light intensity of these optical signals is relatively weak, the optical signals may still interfere with fingerprint information, and affect definition of a fingerprint image. Therefore, reflected light that arrives at the sensor through a plurality of reflections is also a part of stray light.

FIG. 17 is a schematic diagram in which an optical signal arrives at the lens module through a plurality of reflections. For ease of understanding, FIG. 17 shows, by using dashed lines, a field of view of a lens in the lens module 505 and a region that an optical signal incident into the screen assembly along a direction of the field of view can arrive at.

For ease of comparison, (a) in FIG. 17 is a schematic diagram in which a fingerprint optical signal arrives at the lens module, and (b) in FIG. 17 is a schematic diagram in which a fingerprint optical signal arrives at the lens module through a plurality of reflections. For descriptions of (a) in FIG. 17, refer to the above related descriptions of (a) in FIG. 3. For brevity, details are not described herein again. In (b) in FIG. 17, some optical signals with relatively small emergent angles (for example, an optical signal d shown in the figure) may not be blocked by the light shielding member and are still incident into the screen assembly, but arrive at a lower surface of the screen assembly after being reflected on an upper surface of the screen assembly. Specifically, an optical signal may be reflected on an upper surface of a cover glass in the screen assembly, and is reflected back after arriving at an upper surface of the substrate in the screen assembly. The optical signal may also enter an image capturing region through one or more reflections on the upper surface and the lower surface, and is finally incident into the lens module, thereby causing interference to fingerprint information.

To further reduce impact of stray light on the fingerprint information, blackening processing may be performed on the upper surface and a lower surface of the substrate of the screen assembly, to absorb an optical signal that is reflected twice, thereby preventing the optical signal from arriving at the lens module through a plurality of reflections.

It should be understood that, the blackening processing performed on the substrate of the screen assembly may be used in combination with the fingerprint recognition module shown above with reference to FIG. 5 to FIG. 16, to reduce stray light to a greater extent.

In addition, a gap between an upper surface of the light shielding member and the lower surface of the screen assembly (for example, a gap between the upper surface of the light shielding member and the lower surface of the screen assembly shown above with reference to FIG. 13 to FIG. 16) may be shielded by filling with light shielding foam, to further reduce stray light.

Therefore, in this embodiment of this application, the light shielding member in the fingerprint recognition module absorbs most of stray light with relatively strong light intensity, and blackening processing is performed on the substrate of the screen assembly to absorb a part of stray light with relatively weak light intensity. In this way, interference from the stray light to the fingerprint information is greatly reduced, so that a fingerprint image with relatively high definition can be obtained, thereby improving fingerprint recognition efficiency.

A plurality of embodiments provided in this application are described in detail with reference to a plurality of accompanying drawings. However, it should be understood that the embodiments and the accompanying drawings are merely examples for ease of understanding of this application, and shall not constitute any limitation on this application. Any method for blocking a large-angle optical signal of the LED by using the light shielding member, to prevent reflected light of the large-angle optical signal from entering the lens module and causing interference to a fingerprint signal shall fall within the protection scope of this application.

For example, the fingerprint recognition module may include a plurality of lens modules. Each lens module may include at least one lens and one sensor. The plurality of lens modules may be alternately disposed with a plurality of LEDs and a plurality of light shielding members, for example, in a form of "ABABA". FIG. 18 is a schematic diagram of arrangement of a plurality of LEDs, a plurality of light shielding members, and a plurality of lens modules in a fingerprint recognition module according to an embodiment of this application. The plurality of LEDs, the plurality of light shielding members, and the plurality of lens modules shown in FIG. 18 may form an array. In each row of the array, a light source assembly including the light shielding member and the LED and the lens module may be arranged in a form of "ABABA". In each column of the array, a light source assembly including the light shielding member and the LED and the lens module may also be arranged in a form of "ABABA". A hollow block in the figure may represent one lens module, and a shaded block may represent one light source assembly (that is, one light shielding member and one LED).

It may be understood that when the plurality of LEDs, the plurality of light shielding members, and the plurality of lens modules are alternately placed, optical signals emitted by the LED in all directions may be reflected to one or more adjacent lens modules. Therefore, in this case, the light shielding member may be designed in a shape that can block large-angle emergent light in all directions. For example, the light shielding member shown in any one of FIG. 9, FIG. 11, and FIG. 13 to FIG. 16 may be used.

Therefore, a light source is provided by using the plurality of LEDs, to improve intensity of an optical signal. In addition, a fingerprint optical signal is collected by using the plurality of lens modules, so that the lens module can collect a fingerprint optical signal with enough light intensity in each region of a fingerprint of a finger. In this way, a complete and high-definition fingerprint image can be obtained, thereby improving fingerprint recognition efficiency.

It should be understood that FIG. 18 is merely illustrative for ease of understanding, and shall not constitute any limitation on this application. A shape of the lens module is not necessarily a square, and shapes of the light shielding member and the LED are not necessarily squares either. A quantity of rows and a quantity of columns included in the array are not necessarily as illustrated in the figure.

It should be noted that when there are a plurality of lens modules, each lens module may generate fingerprint information based on a received fingerprint optical signal, and generate a fingerprint image based on the fingerprint information. Fingerprint images generated by the plurality of lens modules may be synthesized into one complete fingerprint image. For a specific method for synthesizing the fingerprint images by the plurality of lens modules, refer to the prior art. For brevity, detailed descriptions of the specific method are omitted herein.

It should be understood that, in this application, a structure of the fingerprint recognition module provided in this application and a specific process in which the fingerprint recognition module is configured to recognize a fingerprint are described in detail with reference to a plurality of embodiments and accompanying drawings. These embodiments and accompanying drawings are merely intended to help a person skilled in the art better understand the technical solutions of this application, but are not intended to limit the technical solutions of this application. Benefiting from the guidance presented in the foregoing descriptions and related accompanying drawings, a person skilled in the art will figure out many improvements and other embodiments of this application. Therefore, this application is not limited to the disclosed specific embodiments.

This application further provides an electronic device. The electronic device may include a screen assembly and the fingerprint recognition module shown in any one of the plurality of embodiments, for example, the embodiments of the fingerprint recognition module shown above with reference to FIG. 5 to FIG. 9 and FIG. 11 to FIG. 18.

Figure 19:
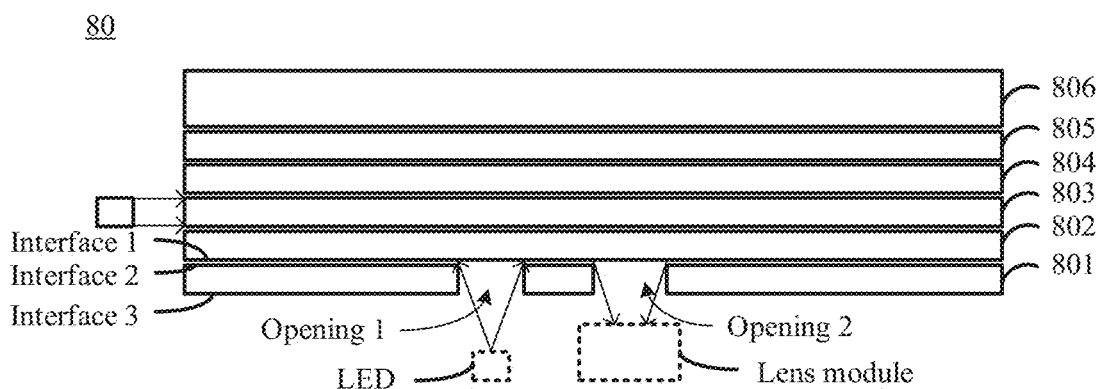
FIG. 19 is a schematic diagram of a screen assembly according to an embodiment of this application.

To reduce light leakage and obtain a better fingerprint recognition effect, this application further provides a screen assembly. FIG. 19 is a schematic diagram of a screen assembly according to an embodiment of this application. As shown in FIG. 19, the screen assembly 80 may include at least a substrate 801 and a reflective film 802. The substrate 801 and the reflective film 802 are arranged in a stacked manner in a sequence of gradually getting away from a light source. The light source may be, for example, the above LED, such as an infrared LED or another light source of an optical signal with relatively strong penetration force. This is not limited in this application.

In addition, the screen assembly 80 may further include a light guide layer 803, a light uniformizing layer (which may also be referred to as a diffusion sheet) 804, an antireflective film 805, and a cover glass 806. The foregoing layers may be arranged in a stacked manner in a sequence of gradually getting away from the light source. For details, refer to FIG. 19. A structure of the screen assembly is described in detail above with reference to FIG. 2. Therefore, for brevity, details are not described herein again.

As described above, to ensure that an optical signal emitted by the LED can penetrate the screen assembly 80 to arrive at a finger, opening processing may be performed at a position that is on the substrate 801 of the screen assembly 80 and that is corresponding to the LED. To ensure that an optical signal that is returned by the finger and that carries fingerprint information penetrates the screen assembly 80 to arrive at an image sensor, opening processing may be performed at a position that is on the substrate 801 of the screen assembly 80 and that is corresponding to the image sensor. Therefore, the substrate 801 of the screen assembly 80 has at least one opening corresponding to at least one LED and at least one opening corresponding to at least one image sensor. For ease of understanding only, an opening corresponding to the LED in the substrate 801, for example, denoted as an opening 1 (as shown by an opening 1 in the figure), and an opening corresponding to the image sensor, for example, denoted as an opening 2 (as shown by an opening 2 in the figure), are shown in the figure. It may be understood that, in a lower surface of the screen assembly 80 on which the opening processing is performed, a region corresponding to a light emitting surface of the LED is a lower surface of the reflective film 802 in the screen assembly, and a region corresponding to a photosensitive surface of the image sensor is the lower surface of the reflective film 802 in the screen assembly.

It should be noted that, as described above, the above image sensor may be used in combination with at least one lens. Therefore, the above image sensor may be replaced with a lens module. The position corresponding to the image sensor may also be defined as a position corresponding to the lens module or a position corresponding to an image capturing region. A relationship between the image sensor and the lens module is described in detail above. For brevity, details are not described herein again. In addition, a size and a position of an opening are described in detail above with reference to a plurality of accompanying drawings. Therefore, for brevity, details are not described herein again.

In this embodiment of this application, to reduce light leakage, processing may be performed on a plurality of interfaces in the screen assembly 80, to reduce interference from stray light to a fingerprint optical signal received by the sensor. For ease of understanding, FIG. 19 shows a plurality of interfaces. As shown in the figure, the plurality of interfaces may specifically include an interface 1, an interface 2, and an interface 3. The interface 1 is the lower surface of the reflective film 802, the interface 3 is a lower surface of the substrate 801, and the interface 2 is an upper surface of the substrate 801. It may be learned that the interface 3 is opposite to the interface 1. It should be understood that the interface 1 to the interface 3 are merely named for ease of differentiation, and shall not constitute any limitation on a stacking sequence. It should be further understood that the figure is merely an example in which a plurality of layers are distinguished by using gaps, and does not represent a real form of a product.

Interface processing is performed on the lower surface of the reflective film 802 and an interface below the lower surface, and interface processing is not performed on the upper surface of the reflective film 802 and an interface above the upper surface, because visible light may be incident from a side surface of the screen assembly 80, as shown on the left side of the figure. Visible light is incident from the side surface of the screen assembly 80 to the reflective film 802, and is reflected by the reflective film 802 to be propagated in a direction of the cover glass, to provide a light source for a screen. If interface processing is performed on the upper surface of the reflective film 802 and the interface above the upper surface, visible light may also be processed while an optical signal emitted by the LED is processed (for example, the optical signal is absorbed or reflected light is reduced, which is specifically described below). In this way, intensity of visible light arriving at the cover glass is reduced, thereby affecting normal display of the screen.

At least one of the interface 1, the interface 2, and the interface 3 is processed, so that one or more optical signal processing layers are added between the interface 1 and the interface 2 and/or on the interface 3. The one or more optical signal processing layers may process an optical signal from the LED in different manners, for example, scattering and absorption, so that reflected light that arrives at the lens module and that does not carry fingerprint information is reduced.

Several possible forms of the optical signal processing layer are shown below.

In a possible design, the one or more optical signal processing layers include a scattering particle. The scattering particle may be used to reduce a reflection on a received optical signal by the interface 1, but upward propagation of the optical signal through the reflective film 802 is not affected. Therefore, one layer of scattering particle is attached to at least one of the interface 1, the interface 2, and the interface 3, so that reflection on a received optical signal can be effectively reduced.

For example, ink that can transmit an optical signal may be sprayed on at least one of the interface 1, the interface 2, and the interface 3.

In an example, ink is sprayed on the interface 1. The LED is an infrared LED, and an infrared optical signal emitted by the infrared LED may be propagated in the direction of the glass cover through ink. However, because the ink includes a scattering particle, a reflection effect on the infrared optical signal can be reduced, and reflected light at the interface 1 can be reduced.

Optionally, the scattering particle may be attached to partial regions or all regions of the interface 1. The partial regions may be regions of the interface 1 that are opposite to the LED and/or the lens module, that is, positions corresponding to the opening 1 and/or the opening 2 shown in FIG. 19.

It should be noted that, because one layer of scattering particle is attached to the interface 1, a part of optical signals that are originally incident into the interface 1 are propagated in another direction through scattering, and thus cannot arrive at a fingerprint on the top of the screen. Generally, optical signals that arrive at the fingerprint are reduced. Therefore, collected fingerprint optical signals may be reduced, and an imaging effect is affected to some extent. It should be further noted that, because opening processing needs to be performed on regions that are in the substrate and that are corresponding to the LED and the image sensor, when the scattering particle is attached to the interface 2 and/or the interface 3, interface processing probably cannot be performed on the regions in which the opening processing is performed (the opening 1 and the opening 2 shown in FIG. 19).

In another possible design, one layer of linear polarizer and one layer of quarter-wave plate (quarter-wave plate) are added between the interface 1 and the interface 2, to reduce a reflection on a received optical signal by the interface 1. In other words, the optical signal processing layer includes one layer of linear polarizer and one layer of quarter-wave plate.

The linear polarizer is located below the quarter-wave plate, or in other words, the linear polarizer is closer to the LED than the quarter-wave plate. Therefore, an infrared signal from the LED may first arrive at the linear polarizer, and then arrive at the quarter-wave plate. An optical signal reflected from an interface above the reflective film 802 may first arrive at the quarter-wave plate, and then arrive at the linear polarizer.

One layer of linear polarizer and one layer of quarter-wave plate are added between the interface 1 and the interface 2 obtained in the manner 2. After optical signals from the LED pass through the linear polarizer and the quarter-wave plate, a part of optical signals through the interface 1 may pass through the quarter-wave plate again after being reflected by an interface above the interface 1, and phases of the optical signals are rotated by 90 degrees. Therefore, this part of reflected optical signals do not enter the linear polarizer, and thus do not enter the image sensor. Therefore, the linear polarizer and the quarter-wave plate may be configured to isolate reflected light above the reflective film. The linear polarizer and the quarter-wave plate may be added between the interface 1 and the interface 2 by using, for example, a plating process, or the linear polarizer and the quarter-wave plate may be placed flat between the interface 1 and the interface 2. A specific implementation is not limited in this application.

It should be noted that one layer of linear polarizer and one layer of quarter-wave plate are added to the interface 1 to reduce reflected light, and the reflected light is isolated only by changing a phase of the light. However, transmission light is not affected. Therefore, impact on a fingerprint optical signal is very small, and an imaging effect is basically not affected.

Because costs brought by adding the linear polarizer and the quarter-wave plate are relatively high, it may be considered to add the linear polarizer and the quarter-wave plate to partial regions of the interface 1. In other positions, another interface processing manner with low costs may be considered. The partial regions of the interface 1 may be specifically regions of the interface 1 that are opposite to the LED and/or the lens module, that is, positions corresponding to the opening 1 and/or the opening 2 shown in FIG. 19.

Certainly, the linear polarizer and the quarter-wave plate may be alternatively added to all region of the interface 1. This is not limited in this application.

It should be understood that the foregoing manner of attaching the scattering particle to at least one of the interface 1, the interface 2, and the interface 3 may be alternatively combined with the foregoing manner of adding one layer of linear polarizer and one layer of quarter-wave plate between the interface 1 and the interface 2. This is not limited in this application.

When the foregoing manners are combined, the optical signal processing layer may include at least one layer of scattering particle, one layer of linear polarizer, and one layer of quarter-wave plate. A sequence of stacking the scattering particle, the linear polarizer, and the quarter-wave plate below the interface 1 is not limited in this application.

For example, the scattering particle may be located above the linear polarizer and the quarter-wave plate. That is, an optical signal from the LED successively arrives at the quarter-wave plate, the linear polarizer, and the scattering particle. In this case, the scattering particle may be attached to a lower surface of the interface 1 by using a process such as spraying or plating.

The scattering particle may be alternatively located below the linear polarizer and the quarter-wave plate, and is closer to the LED. In this case, the scattering particle may be attached to an upper surface of the interface 2 by using the foregoing process such as spraying or plating.

There may be alternatively a plurality of layers of scattering particles, for example, two layers of scattering particles. One layer of scattering particle is attached to a lower part of the interface 1, and the other layer of scattering particle is attached to an upper part of the interface 2. A wired polarizer and a quarter-wave plate are disposed between the two layers of scattering particles. In this case, it is equivalent to that interface processing is separately performed on the interface 1 and the interface 2.

In still another possible design, a light uniformizing film is additionally disposed between the interface 1 and the interface 2. That is, the optical signal processing layer is a light uniformizing film. The light uniformizing film may transmit an optical signal emitted by the LED, and has a scattering characteristic, so that a reflection on a received optical signal by the interface 1 and the interface 2 can be reduced.

The light uniformizing film may be laid flat between the interface 1 and the interface 2. For example, the light uniformizing film may be disposed only at positions that are between the interface 1 and the interface 2 and that are corresponding to the LED and/or the lens module, that is, positions corresponding to the opening 1 and/or the opening 2 in the figure, or may be disposed on an entire interface of the interface 1 or the interface 2. This is not limited in this application. It should be understood that the foregoing manner of attaching the scattering particle to at least one of the interface 1, the interface 2, and the interface 3 may be alternatively combined with the foregoing manner of adding the light uniformizing film between the interface 1 and the interface 2. In other words, the linear polarizer and the quarter-wave plate above are replaced with the light uniformizing film. For brevity, details are not described herein.

In yet another possible design, one layer of light absorbing material is attached to at least one of the interface 2 and the interface 3. That is, at least one optical signal processing layer includes a light absorbing material. The light absorbing material may absorb a part of stray light, thereby reducing reflected light.

It should be noted that, as described above, opening processing is performed on the substrate 801, and the substrate 801 has at least one opening 1 and at least one opening 2 shown in FIG. 19. Therefore, when the light absorbing material is attached to the interface 2 and/or the interface 3, regions of the opening 1 and the opening 2 may be avoided.

Figure 20:
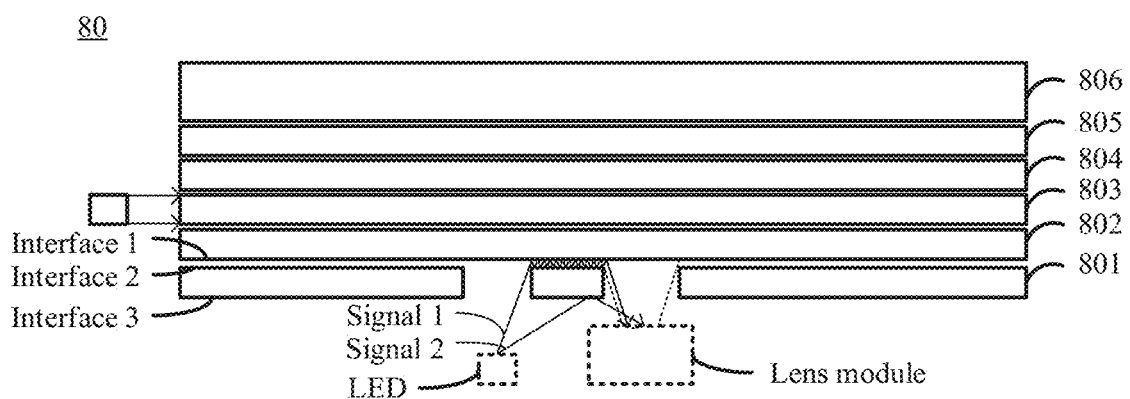
FIG. 20 is a schematic reflection diagram of an optical signal on an interface 2 and an interface 3 according to an embodiment of this application.

For ease of understanding, FIG. 20 is a schematic diagram in which an optical signal is separately reflected on the interface 2 and the interface 3. As shown in FIG. 20, after optical signals are emitted from the LED, a part of optical signals with relatively small incident angles may arrive at the interface 1 through an opening. An optical signal that arrives at the interface 1 may be reflected to the interface 2, and then may arrive at a surface of the sensor through one or more reflections between the interface 1 and the interface 2, as shown by a signal 1 in the figure. Another part of optical signals with relatively large incident angles may be directly emitted to the interface 3, and may also arrive at the sensor after being reflected by the interface 3, as shown by a signal 2 in the figure. It may be understood that none of the optical signals that arrive at the sensor through the one or more reflections between the interface 1 and the interface 2 and the optical signals that arrive at the sensor through the reflection of the interface 3 carries fingerprint information. These optical signals cause interference to a fingerprint optical signal received by the sensor, and therefore belong to stray light. Therefore, the light absorbing material may be attached to at least one of the interface 2 and the interface 3, to reduce reflected light, thereby reducing stray light that arrives at the sensor through one or more reflections.

The method for attaching the light absorbing material to the interface 2 and/or the interface 3 may be implemented, for example, by using a process such as spraying or plating. In a possible implementation, the light absorbing material may be sprayed or electroplated on the interface 2 and/or the interface 3. For example, the LED is an infrared LED, and the light absorbing material sprayed or electroplated on the interface 2 and/or the interface 3 may be an infrared light absorbing material. The infrared light absorbing material may be used to absorb a received infrared optical signal.

It should be understood that, on a premise that no conflict occurs, the manner of attaching the light absorbing material to at least one of the interface 2 and the interface 3 may be combined with the manner of attaching the scattering particle to at least one of the interface 1, the interface 2, and the interface 3 and the manner of adding one layer of linear polarizer and one layer of quarter-wave plate between the interface 2 and the interface 3, or may be combined with the manner of attaching the scattering particle to at least one of the interface 1, the interface 2, and the interface 3 and the manner of adding one layer of light uniformizing film between the interface 2 and the interface 3, or may be combined with the manner of attaching the scattering particle to at least one of the interface 1, the interface 2, and the interface 3, the manner of adding one layer of linear polarizer and one layer of quarter-wave plate between the interface 2 and the interface 3, and the manner of adding one layer of light uniformizing film between the interface 2 and the interface 3. In this case, the optical signal processing layer may include a plurality of different processing layers. Functions of the processing layers are described in detail above. For brevity, details are not described herein again.

It should be understood that, based on a same concept, a person skilled in the art may perform combinations or equivalent replacements on various different optical signal processing layers listed above, and these combinations or equivalent replacements shall fall within the protection scope of this application.

Based on the foregoing solution, the optical signal processing layer is additionally disposed in the screen assembly, so that a reflection on an optical signal from the LED by an interface can be reduced by processing the optical signal, thereby avoiding interference from stray light to a fingerprint optical signal. In this way, a relatively clear fingerprint image can be obtained, thereby improving fingerprint recognition efficiency.

It should be understood that the screen assembly 80 provided above may be used in combination with the fingerprint recognition module provided above, or may be applied to another optical under-display fingerprint recognition system. This is not limited in this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A fingerprint recognition device configured to be disposed below a screen assembly of an electronic device, wherein the screen assembly comprises a lower surface, wherein the electronic device comprises a middle frame located between the screen assembly and the fingerprint recognition device when the fingerprint recognition device is disposed in the electronic device, and wherein the fingerprint recognition device comprises:
   a light-emitting diode (LED) comprising:
      a first side; and
      a light emitting surface configured to:
         be disposed opposite the lower surface; and
         emit a first optical signal;
   an image sensor located on the first side and comprising a photosensitive surface that is configured to:
      be disposed opposite the lower surface; and
      receive a second optical signal that comprises a fingerprint optical signal; and
   a light shielding member located between the LED and the image sensor and configured to:
      be integrated into the middle frame; and
      block a part of third optical signals emitted by the LED, wherein the middle frame comprises a light-through hole in a region corresponding to the LED, and wherein the light-through hole comprises a hole wall that surrounds the third optical signals and is configured to block the part of the third optical signals.

2. The fingerprint recognition device of claim 1, wherein the LED comprises a light emitting center and is configured to emit a fourth optical signal that has an emergent angle greater than θ and that passes through the light emitting center and a center of an active area of the image sensor, wherein the light shielding member is further configured to block the fourth optical signal, and wherein θ is a predefined value.

3. The fingerprint recognition device of claim 1, wherein a first distance (L) between a light emitting center of the LED and a center of an active area of the image sensor satisfies the following first equation:

$$L \geq h \times \tan\theta + d \times \tan\theta' + d \times \tan\beta' + t \times \tan\beta,$$

wherein h represents a second distance between the light emitting surface and the lower surface when the fingerprint recognition device is disposed in the electronic device, wherein d represents a third distance between an upper surface of the screen assembly and the lower surface, wherein t represents a fourth distance between the photosensitive surface and the lower surface when the fingerprint recognition device is disposed in the electronic device, wherein θ is a predefined value representing a maximum emergent angle that can be reached after a fourth optical signal emitted by the LED is shielded by the light shielding member on a plane that passes through the light emitting center and the center, wherein θ' represents a first emergent angle that is reached after a fifth optical signal having a first incident angle of θ is refracted on a second surface of the screen assembly, wherein β is ½ of a field of view of the image sensor, and wherein β' represents a second incident angle corresponding to a second emergent angle (β) when a sixth optical signal is refracted on the second surface.

4. The fingerprint recognition device of claim 3, wherein L further satisfies the following second equation:

$$L \geq h \times \tan\theta + d \times \tan\theta' + d \times \tan\beta' + t \times \tan\beta + \Delta,$$

wherein Δ represents a system tolerance.

5. The fingerprint recognition device of claim 1, wherein the light shielding member is a mechanical part comprising the light through-hole.

6. The fingerprint recognition device of claim 1, wherein the fingerprint recognition device is configured to be carried on a holder and to be fastened below the screen assembly using the holder.

7. The fingerprint recognition device of claim 1, wherein either a surface of the light shielding member that surrounds a fourth optical signal of the LED is coated with a light absorbing material or the light shielding member is made of the light absorbing material.

8. The fingerprint recognition device of claim 1, further comprising:
   a plurality of LEDs comprising the LED; and
   a plurality of light shielding members comprising the light shielding member and corresponding to the LEDs,
   wherein the LEDs and the light shielding members are uniformly distributed around the image sensor, and
   wherein each of the light shielding members is partially or entirely located between a corresponding LED and the image sensor.

9. The fingerprint recognition device of claim 1, wherein the LED is an infrared LED.

10. The fingerprint recognition device of claim 1, further comprising a lens configured to be disposed between the screen assembly and the image sensor when the fingerprint recognition device is disposed in the electronic device, wherein the lens comprises an imaging center that coincides with a center of an active area of the image sensor, and wherein the lens is configured to:
   receive fourth optical signals; and
   converge the fourth optical signals onto the image sensor.

11. The fingerprint recognition device of claim 10, wherein a first distance (U) between a light emitting center of the LED and the imaging center satisfies the following equation:

$$L' \geq h \times \tan\theta + d \times \tan\theta' + d \times \tan\alpha' + t' \times \tan\alpha + CA/2,$$

wherein h represents a second distance between the light emitting surface and the lower surface when the fingerprint recognition device is disposed in the electronic device, wherein d represents a third distance between an upper surface of the screen assembly and the lower surface when the fingerprint recognition device is disposed in the electronic device, wherein t' represents a fourth distance between a first surface on which an out-light hole of the lens is located and the lower surface when the fingerprint recognition device is disposed in the electronic device, wherein θ is a predefined value representing a maximum emergent angle that can be reached after a fifth optical signal emitted by the LED is shielded by the light shielding member on a plane that passes through the light emitting center and the center, wherein θ' represents a first emergent angle that is reached after a sixth optical signal having a first incident angle of θ is refracted on a second surface of the screen assembly, wherein CA represents a diameter of the out-light hole, wherein α is ½ of a field of view of the lens, and wherein α' represents a second incident angle corresponding to a second emergent angle (α) when a seventh optical signal is refracted on the second surface.

12. An electronic device comprising:
a screen assembly comprising a lower surface;
a fingerprint recognition system coupled to the screen assembly and comprising:
  a light-emitting diode (LED) comprising:
    a first side; and
    a light emitting surface located opposite the lower surface and configured to emit a first optical signal;
  an image sensor located on the first side and comprising a photosensitive surface located opposite the lower surface and configured to receive a second optical signal, wherein the second optical signal comprises a fingerprint optical signal for generating a fingerprint image; and
  a light shielding member located between the LED and the image sensor and configured to block a part of third optical signals emitted by the LED; and
a middle frame located between the screen assembly and the fingerprint recognition system, wherein the middle frame comprises a light-through hole in a region corresponding to the LED, and wherein a hole wall of the light-through hole surrounds the third optical signals and is configured to block the part of the third optical signals.

13. The electronic device of claim 12, wherein the LED comprises a light emitting center and is configured to emit a fourth optical signal that has an emergent angle greater than θ and that passes through the light emitting center and a center of an active area of the image sensor, wherein the light shielding member is further configured to block the fourth optical signal, and wherein θ is a predefined value.

14. The electronic device of claim 12, wherein a first distance (L) between a light emitting center of the LED and a center of an active area of the image sensor satisfies the following equation:

$$L \geq h \times \tan\theta + d \times \tan\theta' + d \times \tan\beta' + t \times \tan\beta,$$

wherein h represents a second distance between the light emitting surface and the lower surface, wherein d represents a third distance between an upper surface of the screen assembly and the lower surface, wherein t represents a fourth distance between the photosensitive surface and the lower surface, wherein θ is a predefined value representing a maximum emergent angle that can be reached after a fourth optical signal emitted by the LED is shielded by the light shielding member on a plane that passes through the light emitting center and the center, wherein θ' represents a first emergent angle that is reached after a fifth optical signal having a first incident angle of θ is refracted on a surface of the screen assembly, wherein β is ½ of a field of view of the image sensor, and wherein β' represents a second incident angle corresponding to a second emergent angle (β) when a sixth optical signal is refracted on the surface.

15. The electronic device of claim 12, wherein the light shielding member is a mechanical part comprising the light-through hole.

16. The electronic device of claim 12, further comprising a holder, wherein the fingerprint recognition system is carried on the holder, and wherein the holder is configured to fasten the fingerprint recognition system below the screen assembly and comprises:
  a primary compartment configured to accommodate the image sensor; and
  a secondary compartment configured to accommodate the LED, wherein the light shielding member is integrated into the secondary compartment, wherein the secondary compartment is a light-through hole that penetrates a thickness direction of the holder and corresponds to a region of the LED, and wherein a hole wall of the light-through hole surrounds the third optical signals and is configured to block the part of the third optical signals.

17. The electronic device of claim 16, wherein a blackening processing has been performed on the hole wall and a hole end face of the light-through hole, and wherein the light-through hole is configured to absorb a received optical signal.

18. The electronic device of claim 12, wherein the screen assembly further comprises a substrate located at a bottom layer of the screen assembly, wherein a lower surface of the substrate is opposite to the fingerprint recognition system, wherein a blackening processing is performed on an upper surface of the substrate and the lower surface, and wherein the substrate is configured to absorb a received optical signal.

19. The electronic device of claim 12, wherein the light shielding member comprises a light absorbing material.

20. The electronic device of claim 12, wherein a surface of the light shielding member that surrounds a fourth optical signal of the LED is coated with a light absorbing material.

* * * * *

UNITED STATES PATENT AND TRADEMARK OFFICE
CERTIFICATE OF CORRECTION

PATENT NO. : 11,625,944 B2
APPLICATION NO. : 17/604678
DATED : April 11, 2023
INVENTOR(S) : Jiao Lin, Xu Peng and Xiujuan Wan It is certified that error appears in the above-identified patent and that said Letters Patent is hereby corrected as shown below:

In the Claims

Claim 11, Column 51, Line 2: "distance (U) between" should read "distance (L') between"

Signed and Sealed this
Twenty-third Day of May, 2023

Katherine Kelly Vidal
Director of the United States Patent and Trademark Office